(12) United States Patent
Centner

(10) Patent No.: US 12,636,725 B2
(45) Date of Patent: May 26, 2026

(54) CONTACT TIP AND LINER ASSEMBLY FOR WELDING TORCH

(71) Applicant: ILLINOIS TOOL WORKS INC., Glenview, IL (US)

(72) Inventor: Robert Joseph Centner, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 708 days.

(21) Appl. No.: 15/370,884

(22) Filed: Dec. 6, 2016

(65) Prior Publication Data

US 2017/0165780 A1     Jun. 15, 2017

Related U.S. Application Data

(60) Provisional application No. 62/368,478, filed on Jul. 29, 2016, provisional application No. 62/266,389, filed on Dec. 11, 2015.

(51) Int. Cl.
B23K 9/16 (2006.01)
B23K 9/173 (2006.01)
(Continued)

(52) U.S. Cl.
CPC ............... B23K 9/16 (2013.01); B23K 9/173 (2013.01); B23K 9/26 (2013.01); B23K 9/295 (2013.01)

(58) Field of Classification Search
CPC .......... B23K 9/173; B23K 9/26; B23K 9/295; B23K 9/16
(Continued)

(56) References Cited

U.S. PATENT DOCUMENTS 3,210,523 A     10/1965     Cotter
3,541,298 A     11/1970     Carkhuff
(Continued)

FOREIGN PATENT DOCUMENTS

CA     2535864     3/2005
CH     509127     6/1971
(Continued)

OTHER PUBLICATIONS

Taper_Definition Meaning__Merriam_-_Webster.pdf (Year: 2005).*
(Continued)

*Primary Examiner* — Tiffany T Tran
(74) *Attorney, Agent, or Firm* — McAndrews, Held & Malloy, Ltd.

(57)     ABSTRACT

In certain embodiments, a welding contact tip includes a first axial end portion having a welding wire outlet of an internal bore of the welding contact tip. The welding contact tip also includes a threaded middle portion adjacent the first axial end portion. The threaded middle portion includes external threads configured to mate with internal threads of a gas diffuser of a welding torch. The first axial end portion includes a tapered outer surface adjacent the threaded middle portion. The welding contact tip further includes a second axial end portion adjacent the threaded middle portion. In other embodiments, a welding torch liner assembly includes a liner stop configured to be attached to a first axial end of a welding torch liner. The welding torch liner assembly also includes a liner receiver configured to secure a second axial end of the welding torch liner. The second axial end of the welding torch liner is opposite the first axial end of the welding torch liner.

16 Claims, 23 Drawing Sheets

(51) Int. Cl.
   *B23K 9/26*          (2006.01)
   *B23K 9/29*          (2006.01)
(58) Field of Classification Search
   USPC ........................................ 219/137.42, 137.61
   See application file for complete search history.

(56)                    References Cited

U.S. PATENT DOCUMENTS

| | | | |
|---|---|---|---|
| 3,576,423 A | 4/1971 | Bernard | |
| 3,596,049 A | 7/1971 | Ogden | |
| 3,597,576 A * | 8/1971 | Bernard ................. | B23K 9/295 |
| | | | 219/137.43 |
| 3,689,732 A | 9/1972 | Hill | |
| 4,280,043 A | 7/1981 | Feix | |
| 4,529,863 A | 7/1985 | Lebel | |
| 4,563,569 A | 1/1986 | Shiramizu | |
| 4,672,163 A | 6/1987 | Matsui | |
| 4,675,493 A * | 6/1987 | Gartland ................. | B23K 9/291 |
| | | | 219/74 |
| 4,767,908 A | 8/1988 | Dallavalle | |
| 4,945,208 A | 7/1990 | Lian | |
| 4,954,688 A | 9/1990 | Winterfeldt | |
| 5,013,885 A | 5/1991 | Carkhuff | |
| 5,338,917 A | 8/1994 | Stuart | |
| 5,380,980 A | 1/1995 | Colling | |
| 5,440,100 A | 8/1995 | Stuart | |
| 5,491,321 A | 2/1996 | Stuart | |
| 5,635,090 A | 6/1997 | Lubieniecki | |
| 5,669,556 A | 9/1997 | Yoshida | |
| 5,726,420 A | 3/1998 | Lajoie | |
| 5,760,373 A | 6/1998 | Colling | |
| 5,772,102 A | 6/1998 | New | |
| 6,075,227 A | 6/2000 | Lajoie | |
| 6,078,023 A | 6/2000 | Jones | |
| 6,163,008 A | 12/2000 | Roberts | |
| 6,191,380 B1 | 2/2001 | Thomas | |
| 6,225,599 B1 | 5/2001 | Altekruse | |
| 6,271,497 B1 | 8/2001 | Zapletal | |
| 6,307,179 B1 | 10/2001 | Walters | |
| 6,525,297 B2 | 2/2003 | Doherty | |
| 6,657,162 B1 | 12/2003 | Jung | |
| 6,740,848 B2 | 5/2004 | Parker | |
| 6,744,013 B2 | 6/2004 | Jones | |
| 6,847,009 B2 | 1/2005 | Stuart | |
| 6,924,461 B2 * | 8/2005 | Matiash ................. | B23K 9/323 |
| | | | 219/137.42 |
| 7,105,775 B2 | 9/2006 | Giese | |
| 7,176,412 B2 | 2/2007 | Wells | |
| 7,342,200 B2 | 3/2008 | Eberle | |
| 2003/0057196 A1 * | 3/2003 | Jones ..................... | B23K 9/295 |
| | | | 219/137.42 |
| 2003/0209530 A1 | 11/2003 | Stuart | |
| 2005/0218132 A1 | 10/2005 | Wells | |
| 2013/0126504 A1 | 5/2013 | Hassan | |
| 2013/0126505 A1 | 5/2013 | Hassan | |
| 2013/0126506 A1 | 5/2013 | Hassan | |
| 2013/0134143 A1 | 5/2013 | Hassan | |
| 2014/0263251 A1 | 9/2014 | Enyedy | |
| 2014/0263253 A1 | 9/2014 | Meess | |
| 2014/0263254 A1 | 9/2014 | Enyedy | |
| 2015/0129570 A1 | 5/2015 | Redding | |
| 2015/0129571 A1 | 5/2015 | Hassan | |
| 2015/0129572 A1 | 5/2015 | Hassan | |
| 2015/0135796 A1 | 5/2015 | Hassan | |
| 2015/0136747 A1 | 5/2015 | Hassan | |
| 2015/0136748 A1 | 5/2015 | Hassan | |
| 2015/0136749 A1 | 5/2015 | Hassan | |
| 2015/0165542 A1 | 6/2015 | Hassan | |
| 2015/0273615 A1 * | 10/2015 | Cooper ................. | B23K 9/295 |
| | | | 219/137.42 |
| 2015/0273616 A1 | 10/2015 | Cooper | |
| 2016/0082540 A1 | 3/2016 | Hassan | |

FOREIGN PATENT DOCUMENTS

| | | |
|---|---|---|
| CN | 87102295 | 10/1987 |
| CN | 101925433 | 12/2010 |
| CN | 102753296 | 10/2012 |
| CN | 104209636 | 12/2014 |
| CN | 104985308 | 10/2015 |
| DE | 202013102979 | 7/2013 |
| EP | 1388388 | 2/2004 |
| EP | 2457682 | 5/2012 |
| FR | 2291819 | 11/1974 |
| FR | 2291819 A1 | 6/1976 |
| JP | H05196022 U | 8/1976 |
| JP | 5290444 | 7/1977 |
| JP | S55156680 A | 12/1980 |
| JP | S57134279 A | 8/1982 |
| WO | 0073700 A1 | 12/2000 |
| WO | 2007030720 | 3/2007 |
| WO | 2008018979 | 4/2008 |
| WO | 2014178556 | 11/2014 |
| WO | 2015148656 | 10/2015 |
| WO | 2016203213 | 12/2016 |
| WO | 2017100508 | 6/2017 |

OTHER PUBLICATIONS

Canadian Office Action Appln No. 3,005,362 dated Mar. 18, 2019 (7 pages).

International Search Report and Written Opinion Appln. No. PCT/US2018/037004, dated Oct. 30, 2018, 15 pgs.

Excerpt from Victor Equipment Company Brochure, pp. 24,32,34 (1951).

Excerpt from Victor Equipment Company Welding and Cutting Equipment Brochure, Catalog 20C 10-51 CW (1965).

International Search Report from PCT application No. PCT/US2016/065722, dated May 30, 2017, 19 pgs.

FasTip Contact Tips, XR-Aluma-Pro Gooseneck-Style Push-Pull Gun, MIG Gun for Aluminum Welding, Miller Electric Manufacturing Company, Jan. 2015, p. 3.

Final Office Action U.S. Appl. No. 15/622,912 dated Jun. 19, 2020.

Non Final Office Action Office Action U.S. Appl. No. 15/622,912 dated Dec. 11, 2019.

Taper Definition & Meaning—Merriam-Webster (Year: 2009).

K. Craig, "Fundamental Principles of Mechanical Design," Mechanical Design Fundamentals, 2010, 102 pages.

Canadian Office Action Appln No. 3,209,861 dated Dec. 16, 2024.

Bernard, "Bernard BTB MIG Guns—Owner's Manual", Internet, OM-BTB-1.4, p. 23, http://www.veldon.sk/wp-content/uploads/2015/09/OM_BTB_.pdf Nov. 2015 (Nov. 2015).

* cited by examiner

56

56

56

56

56

56

56

58

58

58

126

126

56

56

56

56

56

56                    56

CONTACT TIP AND LINER ASSEMBLY FOR WELDING TORCH

CROSS REFERENCE TO RELATED APPLICATIONS

This application is a Non-provisional U.S. patent application of U.S. Provisional Patent Application No. 62/266,389, entitled "Contact Tip Having a Cooling Tail", filed Dec. 11, 2015, and of U.S. Provisional Patent Application No. 62/368,478, entitled "Contact Tip and Liner Assembly for Welding Torch", filed Jul. 29, 2016, both of which are incorporated herein by reference in their entireties for all purposes.

BACKGROUND

The present disclosure relates generally to MIG welding systems and, more particularly, to gas nozzles, gas diffusers, contact tips and liner assemblies for use in welding torches of MIG welding systems.

MIG welding is a process that has increasingly become ubiquitous in various industries and applications. Manual MIG welding processes (i.e., welding in which a person holds and manipulates a MIG welding torch during the process) have been a staple of the welding industry for some time. Additionally, as welding has increased in general, automated MIG welding processes have also becoming increasingly popular. In either style of MIG welding, certain components of the MIG welding torch tend to wear over time, and need replacement. These components are commonly referred to as "consumables". Consumable replacement is an undesirable activity, as it takes time away from the actual welding process. In industry, this translates into reduced productivity and increased costs.

Therefore, it may be advantageous to provide a consumable design that maximizes the performance of these wear parts and simplifies their replacement. The present subject matter provides an improved design for gas nozzles, gas diffusers, contact tips, and liner assemblies for use in welding torches of MIG welding systems.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a welding contact tip includes a first axial end portion having a welding wire outlet of an internal bore of the welding contact tip. The welding contact tip also includes a threaded middle portion adjacent the first axial end portion. The threaded middle portion includes external threads configured to mate with internal threads of a gas diffuser of a welding torch. The welding contact tip further includes a second axial end portion adjacent the threaded middle portion. The first axial end portion includes a tapered outer surface adjacent the threaded middle portion and configured to abut a mating tapered inner surface of the gas diffuser of the welding torch.

In certain embodiments, a system includes a welding contact tip that includes a first axial end portion having a welding wire outlet of an internal bore of the welding contact tip, a threaded middle portion adjacent the first axial end portion, and a second axial end portion adjacent the threaded middle portion. The threaded middle portion includes external threads. The system also includes a gas diffuser having internal threads configured to mate with the external threads of the threaded middle portion of the welding contact tip. The welding contact tip and gas diffuser are configured such that, upon fully seating the welding contact tip into the gas diffuser, the second axial end portion of the welding contact tip (including an axial end face of the second axial end portion) does not contact any internal surface of the gas diffuser.

In certain embodiments, a welding torch gas diffuser includes a tapered inner surface at an axial end of the welding torch gas diffuser. The tapered inner surface is configured to mate with a tapered outer surface of a welding contact tip. The welding torch gas diffuser also includes a threaded inner surface adjacent the tapered inner surface. The threaded inner surface is configured to mate with a threaded outer surface of the welding contact tip. The welding torch gas diffuser further includes a plurality of gas through-ports extending through the welding torch gas diffuser that provide a path for welding gas to pass from an interior of the welding torch gas diffuser to an area between an exterior of the welding torch gas diffuser and an interior of a welding torch nozzle.

In certain embodiments, a welding torch liner assembly includes a liner stop configured to be attached to a first axial end of a welding torch liner. The welding torch liner assembly also includes a liner receiver configured to secure a second axial end of the welding torch liner. The second axial end of the welding torch liner is opposite the first axial end of the welding torch liner.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
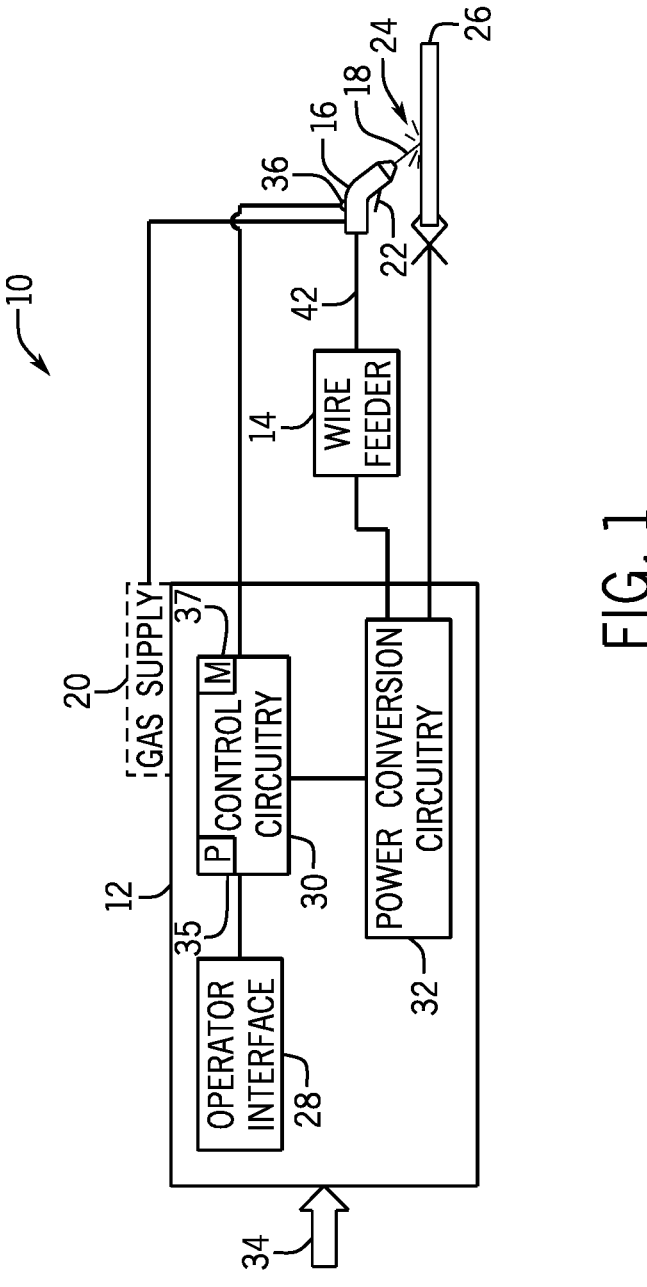
FIG. 1 is an embodiment of a metal inert gas (MIG) welding system with a power source and a wire feeder, in accordance with an embodiment.

One or more embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In conventional MIG welding systems, gas nozzles are axially pushed onto a gas diffuser, and the gas nozzle is held in place by a frictional fit between the two parts. More specifically, the gas diffuser often consists of a relatively flexible member (such as a rubber or steel ring) mounted about a circumference of the gas diffuser that, in its relaxed state, has a slightly larger outer diameter than an internal bore of the gas nozzle. In many conventional systems, the internal bore of the gas nozzle that engages with the gas diffuser is substantially constant in diameter along its length.

As the gas nozzle is pushed onto the gas diffuser, the flexible member radially compresses, allowing the gas nozzle to be installed over the flexible member and fully onto the gas diffuser. In general, the flexible member remains in a compressed state as long as the gas nozzle is installed on the gas diffuser. In the compressed state, the flexible member continuously applies a radial force to the internal bore of the gas nozzle. In general, this radial force provides enough axial friction to prevent the gas nozzle from sliding off of the gas diffuser during use. The friction force, however, is low enough that the gas nozzle may be removed from the gas diffuser without requiring the use of tools (e.g., by a user with his hands).

Relying on axial friction alone to retain the gas nozzle to the gas diffuser can be problematic. Over time, the friction force inevitably lessens, and the gas nozzle may fall off of the gas diffuser. In addition, the flexible member must be stiff enough during its life cycle to provide adequate radial force to retain the gas nozzle, but not so stiff as to make gas nozzle installation/removal difficult. Furthermore, the flexible member must also not be so stiff as to wear away at the internal bore of the gas nozzle during the repeated installations/removals encountered during normal use.

Embodiments of the present disclosure incorporate a flexible member on the gas diffuser that radially compresses as the gas nozzle is installed. However, the embodiments of the present disclosure include an internal bore of the gas nozzle that is not of a constant diameter along its engagement length with the gas diffuser. Rather, the embodiments of the present disclosure include an internal bore of the gas nozzle that allows the flexible member to apply an axial retention force in addition to a frictional force.

In addition, conventional MIG welding systems often include a contact tip having an external threaded portion which mates with internal threads at a front axial end of a gas diffuser. In such designs, the external threading is typically located at, or adjacent to, a rear axial end of the contact tip. Certain designs also feature a tapered seat area directly on the rear axial end of the contact tip to which the threaded area adjoins. In these configurations, when the contact tip is fully installed into the gas diffuser, only the rear face of the contact tip is exposed to welding gas. It should be noted that, as described herein, a "front axial end" (or "distal end" or "distal axial end") refers to an axial end of a component that is nearer to an axial end of the welding torch at which a welding arc is generated and, conversely, a "rear axial end" (or "proximal end" or "proximal axial end") refers to an axial end of a component that is farther away from an axial end of the welding torch at which a welding arc is generated.

Embodiments of the present disclosure, contrary to conventional systems, include external threads near the axial center (i.e., near the middle of the length) of the contact tip. As such, a substantial portion of the rear axial end of the contact tip remains unthreaded. This area may be referred to as a "cooling tail". In such embodiments, the gas diffuser is configured such that when the contact tip is fully installed, the entire unthreaded rear axial portion (i.e., the cooling tail) of the contact tip protrudes into the welding gas stream. As such, the external surfaces of the unthreaded rear axial portion (including the real axial end face) of the contact tip are fully exposed to the welding gas. Placing this rear axial portion of the contact tip into the welding gas stream helps to cool the contact tip during use, thereby leading to better performance and longer life cycles of the cooling tip. Embodiments of the present disclosure also include reduced amount of contact tip surface area exposed to the welding arc during use. By limiting this exposed surface area, less radiant heat is absorbed into the contact tip, thereby also leading to better performance and longer life cycles of the cooling tip. Another benefit of the relatively long cooling tail feature of the contact tip is that it provides a centering lead that helps to axially align the contact tip with the gas diffuser as the contact tip is being installed. As the contact tip is urged into the gas diffuser, the cooling tail of the contact tip limits the axial angle (i.e., the "approach angle") between the contact tip and the gas diffuser. The minimized approach angle reduces the possibility of cross-threading between the contact tip and the gas diffuser.

Certain embodiments of the present disclosure also include an internal bore at the rear axial end of the contact tip that is large enough to fit over a welding torch liner, which provides a conduit through which a consumable wire electrode may travel to the contact tip. In conventional MIG welding systems, welding torch liners are either not in contact with, or simply abut against an axial rear face of a threaded contact tip. In contrast, certain embodiments of the present disclosure enable the welding torch liner to fit inside the axial rear portion of the contact tip, thereby maintaining better concentricity between the welding torch liner and the contact tip and, thus, improved wire electrode feedability.

Turning now to the drawings, and referring first to FIG. 1, a welding system 10 is illustrated as including a power source 12 coupled to a wire feeder 14. In the illustrated embodiment, the power source 12 is separate from the wire feeder 14, such that the wire feeder 14 may be positioned at some distance from the power source 12 near a welding location. However, it should be understood that the wire feeder 14, in some implementations, may be integral with the power source 12. The power source 12 may supply weld power to a torch 16 through the wire feeder 14, or the power source 12 may supply weld power directly to the torch 16. The wire feeder 14 supplies a wire electrode 18 (e.g., solid wire, cored wire, coated wire) to the torch 16. A gas supply 20, which may be integral with or separate from the power source 12, supplies a gas (e.g., $CO_2$, argon) to the torch 16. An operator may engage a trigger 22 of the torch 16 to initiate an arc 24 between the electrode 18 and a work piece 26. In some embodiments, the welding system 10 may be triggered by an automation interface including, but not limited to, a programmable logic controller (PLC) or robot controller. The welding system 10 is designed to provide welding wire (e.g., electrode 18), weld power, and shielding gas to the welding torch 16. As will be appreciated by those skilled in the art, the welding torch 16 may be of many different types, and may facilitate use of various combinations of electrodes 18 and gases.

The welding system 10 may receive data settings from the operator via an operator interface 28 provided on the power source 12. The operator interface 28 may be incorporated into a faceplate of the power source 12, and may allow for selection of settings such as the weld process (e.g., stick, TIG, MIG), the type of electrode 18 to be used, voltage and current settings, transfer mode (e.g., short circuit, pulse, spray, pulse), and so forth. In particular, the welding system 10 allows for MIG welding (e.g., pulsed MIG welding) with electrodes 18 (e.g., welding wires) of various materials, such as steel or aluminum, to be channeled through the torch 16. The weld settings are communicated to control circuitry 30 within the power source 12.

The control circuitry 30 operates to control generation of welding power output that is applied to the electrode 18 by power conversion circuitry 32 for carrying out the desired welding operation. For example, in some embodiments, the control circuitry 30 may be adapted to regulate a pulsed MIG welding regime that may have aspects of short circuit transfer and/or of spray transfer of molten metal from the welding wire to a molten weld pool of a progressing weld. Such transfer modes may be controlled during operation by adjusting operating parameters of current and voltage pulses for arcs 24 developed between the electrode 18 and the work piece 26.

The control circuitry 30 is coupled to the power conversion circuitry 32, which supplies the weld power (e.g., pulsed waveform) that is applied to the electrode 18 at the torch 16. The power conversion circuitry 32 is coupled to a source of electrical power as indicated by arrow 34. The power applied to the power conversion circuitry 32 may originate in the power grid, although other sources of power may also be used, such as power generated by an engine-driven generator, batteries, fuel cells or other alternative sources. Components of the power conversion circuitry 32 may include choppers, boost converters, buck converters, inverters, and so forth.

The control circuitry 30 controls the current and/or the voltage of the weld power supplied to the torch 16. The control circuitry 30 may monitor the current and/or voltage of the arc 24 based at least in part on one or more sensors 36 within the wire feeder 14 or torch 16. In some embodiments, a processor 35 of the control circuitry 30 determines and/or controls the arc length or electrode extension based at least in part on feedback from the sensors 36. The arc length is defined herein as the length of the arc between the electrode 18 and the work piece 26. The processor 35 determines and/or controls the arc length or electrode extension utilizing data (e.g., algorithms, instructions, operating points) stored in a memory 37. The data stored in the memory 37 may be received via the operator interface 28, a network connection, or preloaded prior to assembly of the control circuitry 30. Operation of the power source 12 may be controlled in one or more modes, such as a constant voltage (CV) regulation mode in which the control circuitry 30 controls the weld voltage to be substantially constant while varying the weld current during a welding operation. That is, the weld current may be based at least in part on the weld voltage. Additionally, or in the alternative, the power source 12 may be controlled in a current control mode in which the weld current is controlled independent of the weld voltage. In some embodiments, the power source 12 is controlled to operate in a constant current (CC) mode where the control circuitry 30 controls the weld current to be substantially constant while varying the weld voltage during a welding operation.

Figure 2:
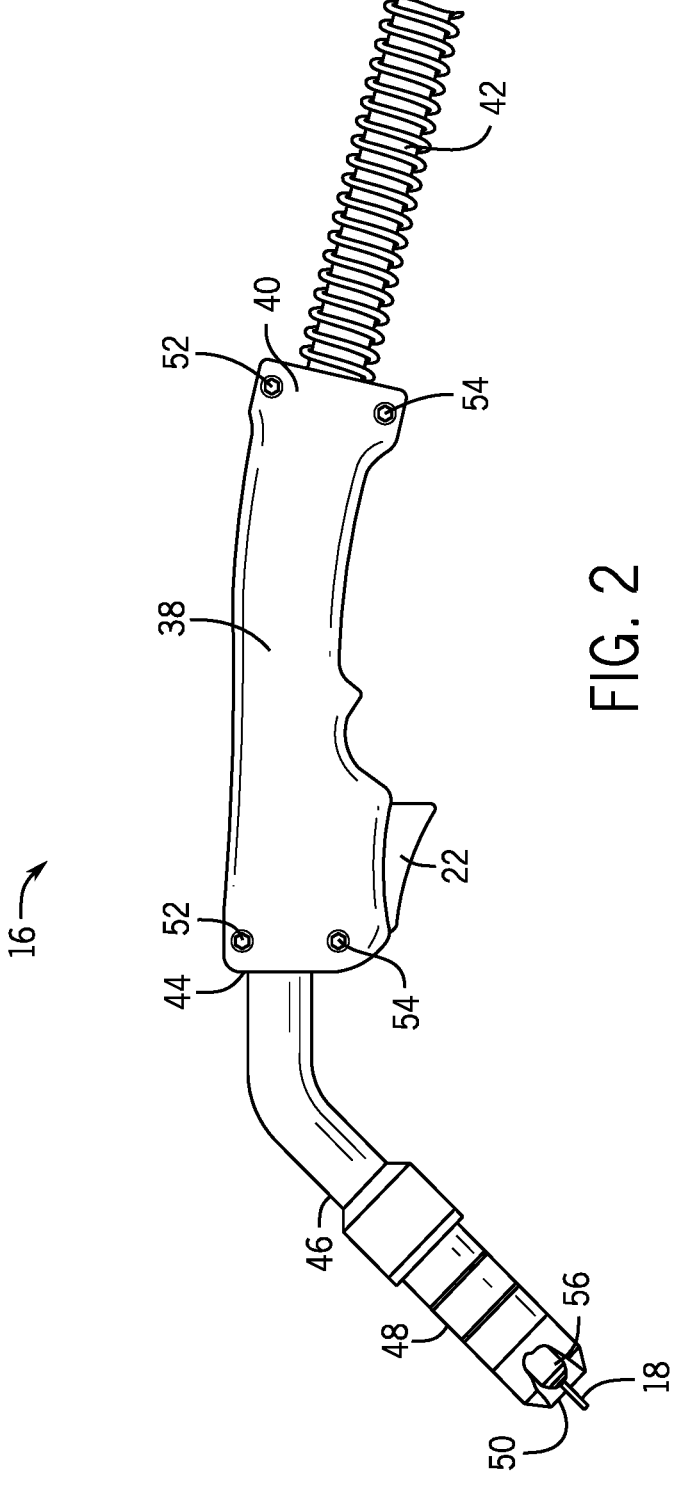
FIG. 2 is a side view of an embodiment of a welding torch of the MIG welding system of FIG. 1, in accordance with an embodiment.

FIG. 2 illustrates an embodiment of the torch 16 of FIG. 1. As described in relation to FIG. 1, the torch 16 includes the trigger 22 for initiating a weld and supplying the electrode 18 to the weld. Specifically, the trigger 22 is disposed on a handle 38. A welding operator holds the handle 38 when performing a weld. At a first end 40, the handle 38 is coupled to a cable 42 where welding consumables (e.g., the electrode, the shielding gas, and so forth) are supplied to the weld. Welding consumables generally travel through the handle 38 and exit at a second end 44, which is disposed on the handle 38 at an end opposite from the first end 40.

The torch 16 includes a gooseneck 46 extending out of the second end 44 of the handle 38. As such, the gooseneck 46 is coupled between the handle 38 and a welding nozzle 48. As should be noted, when the trigger 22 is pressed or actuated, welding wire (e.g., electrode 18) travels through the cable 42, the handle 38, the gooseneck 46, and the welding nozzle 48, so that the welding wire extends out of an end 50 (i.e., torch tip) of the welding nozzle 48. Further, as illustrated in FIG. 2, the handle 38 is secured to the gooseneck 46 via fasteners 52 and 54, and to the cable 42 via fasteners 52 and 54. The welding nozzle 48 is illustrated with a portion of the welding nozzle 48 removed to show the electrode 18 extending out of a contact tip 56 that is disposed within the welding nozzle 48.

Figure 3:
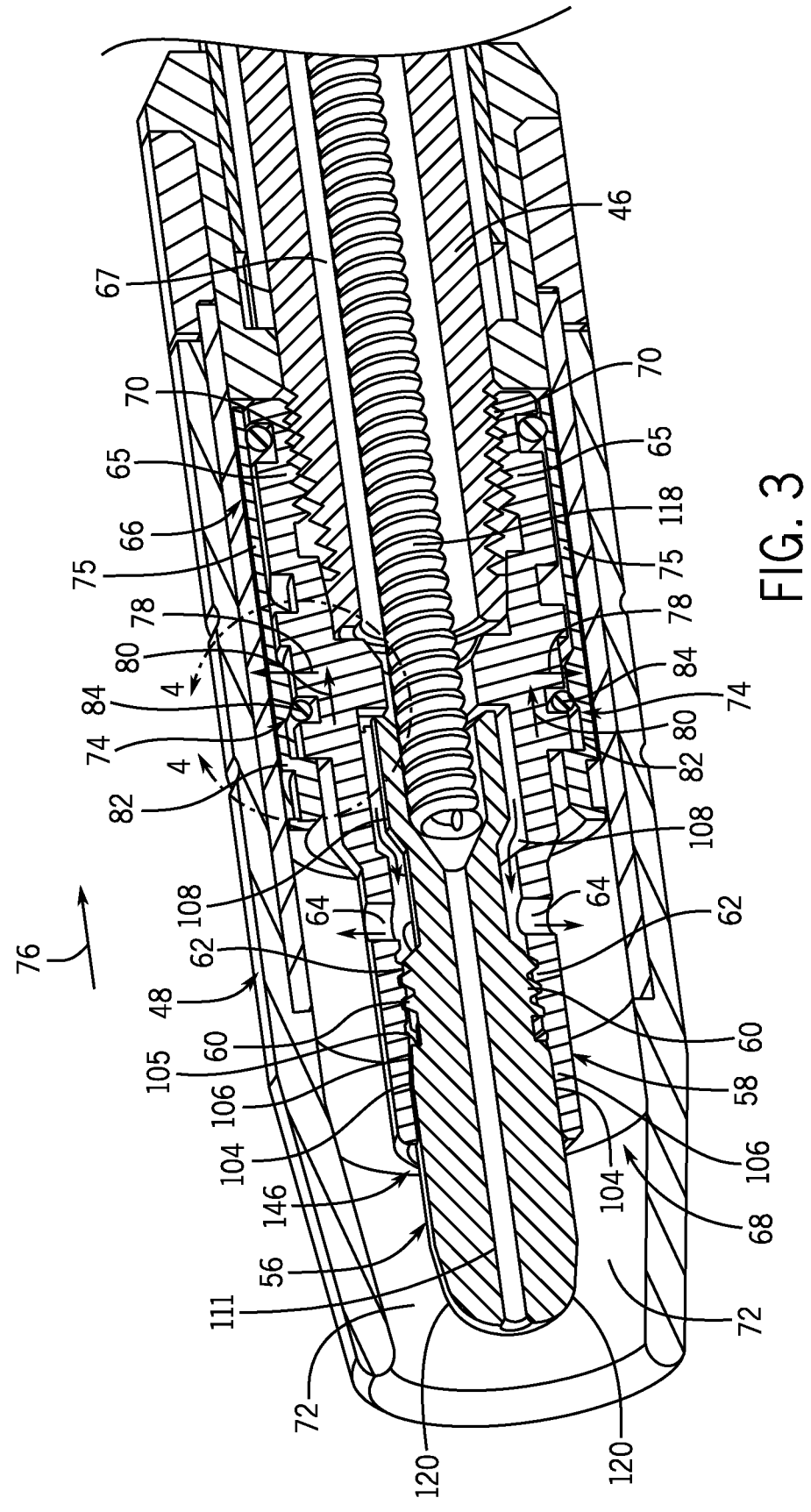
FIG. 3 is a cross-sectional perspective view of a portion of the welding torch of FIG. 2, in accordance with an embodiment.

FIG. 3 is a cross-sectional perspective view of a portion of the welding torch 16 of FIG. 2 in certain embodiments. As illustrated, a gas diffuser 58 receives the contact tip 56 during replacement of the contact tip 56, facilitates mechanical coupling of the contact tip 56 to the welding torch 16 for the contact tip 56, and facilitates electrical coupling to the power source 12 for the contact tip 56 (e.g., by creating an electrical connection between the contact tip 56 and the gooseneck 46 via the gas diffuser 58), as described in detail below. More specifically, in certain embodiments, the contact tip 56 includes external threading 60 that mate with internal threading 62 of the gas diffuser 58 such that the contact tip 56 may be secured (e.g., mechanically affixed) within the welding torch 16 (e.g., to the gooseneck 46 via the gas diffuser 58) by creating a locking, threaded connection between the contact tip 56 and the gas diffuser 58. It should be noted that, in certain embodiments, the gas diffuser 58 also includes a second set of internal threads 65 near an axial end 66 of the gas diffuser 58 opposite the axial end 68 near which the first set of internal threads 62 are located. This second set of internal threads 65 are configured to mate with external threads 70 on an axial end of the gooseneck 46 of the welding torch 16. The welding nozzle 48, contact tip 56, and gas diffuser 58 are each commonly referred to as welding consumables.

Furthermore, the gas diffuser 58 includes gas-through ports 64 extending through the walls of the gas diffuser 58 to facilitate movement of shielding gas to a welding site (e.g., through the welding torch 16 from an interior volume 67 of the gooseneck 46 into an internal volume 72 formed between the welding nozzle 48 and the contact tip 56), as described in greater detail herein. The gas diffuser 58 may also include a compressible member 74, such as a compressible circumferential ring, which facilitates threadless retention of the welding nozzle 48 over the gas diffuser 58. The welding nozzle 48 is axially pushed onto the gas diffuser 58, as illustrated by arrow 76. In certain embodiments, the compressible member 74 may be a rubber or steel ring mounted about an outer circumference of the gas diffuser 58. In its relaxed state, the compressible member 74 may have an outer diameter that is slightly larger than an inner diameter of a portion of the welding nozzle 48 (e.g., a welding nozzle insert 75 in the illustrated embodiment) that abuts the compressible member 74 when the welding nozzle 48 is secured to the gas diffuser 58. As the welding nozzle 48 is pushed onto the gas diffuser 58, the compressible member 74 radially compresses, allowing the welding nozzle 48 to be installed over the compressible member 74 and fully onto the gas diffuser 58. The compressible member 74 remains in a compressed state as long as the welding nozzle 48 is installed on the gas diffuser 58. In the compressed state, the compressible member 74 continuously applies a radial force against the internal bore of the welding nozzle 48, as illustrated by arrows 78.

However, the embodiments described herein do not rely solely on this radial force 78 to provide axial friction to prevent the welding nozzle 48 from sliding off the gas diffuser 58 during use. One reason for this is that relying on axial friction alone to retain the welding nozzle 48 to the gas diffuser 58 would present certain drawbacks. For example, over time, the friction force might inevitably lessen, allowing the welding nozzle 48 to fall off of the gas diffuser 58. More specifically, the compressible member 74 may wear away over time due to repeated installations and/or removals encountered during normal use. To mitigate these drawbacks, as illustrated in FIG. 3, in certain embodiments, the internal bore of the welding nozzle 48 (e.g., the welding nozzle insert 75 in the illustrated embodiment) does not have a constant diameter along its engagement length with the gas diffuser 58, but instead includes an internal bore that allows the compressible member 74 to apply an axial retention force, as illustrated by arrows 80, in addition to the frictional force. More specifically, in certain embodiments, the internal bore of the welding nozzle 48 includes an inner circumferential rib 82 having a tapered surface 84 against which the compressible member 74 interfaces when the welding nozzle 48 is installed onto the gas diffuser 58.

Figure 4:
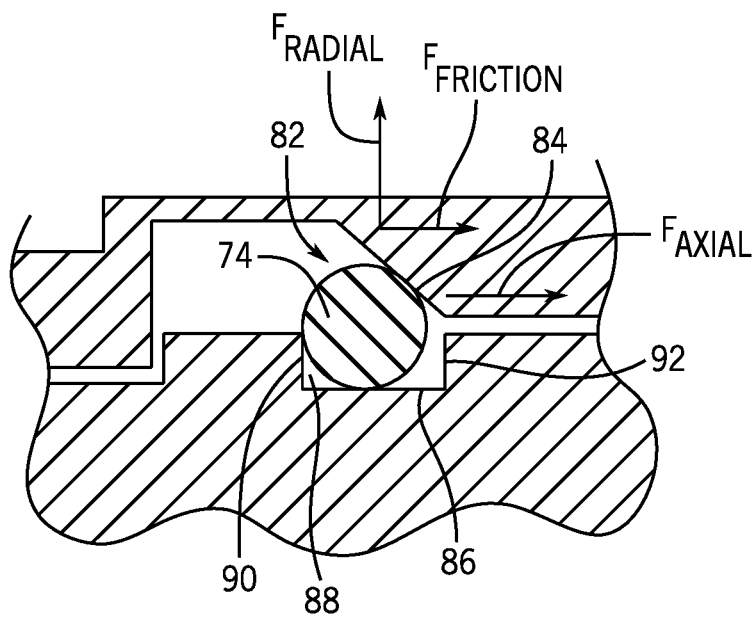
FIG. 4 is a cross-sectional side view of the portion of the welding torch of FIG. 3, in accordance with an embodiment.

FIG. 4 is a cutaway side view of the portion of the welding torch 16 illustrated in FIG. 3. As illustrated, when the welding nozzle 48 is secured to the gas diffuser 58, the compressible member 74 is radially compressed between the tapered surface 84 of the inner circumferential rib 82 of the welding nozzle 48 (e.g., the welding nozzle insert 75 in the illustrated embodiment) and an outer surface 86 of the gas diffuser 58 that forms an outer circumferential groove 88 with adjacent walls 90, 92 that extend radially outward from opposite sides of the outer surface 86. As such, the compressible member 74 creates a radially outward force $F_{radial}$, which creates an axial friction force $F_{force}$ that at least partially holds the welding nozzle 48 in place with respect to the gas diffuser 58. In addition, when the welding nozzle 48 is secured to the gas diffuser 58, the compressible member 74 is axially compressed between the tapered surface 84 of the inner circumferential rib 82 of the welding nozzle 48 (e.g., the welding nozzle insert 75 in the illustrated embodiment) and the first wall 90 of the outer circumferential groove 88 of the gas diffuser 58. As such, the compressible member 74 creates an axial force $F_{axial}$ that at least partially holds the welding nozzle 48 in place with respect to the gas diffuser 58. It should be noted that, in other embodiments, other nozzle retention designs may be used, such as threading or other forms of retainer rings.

Figure 5:
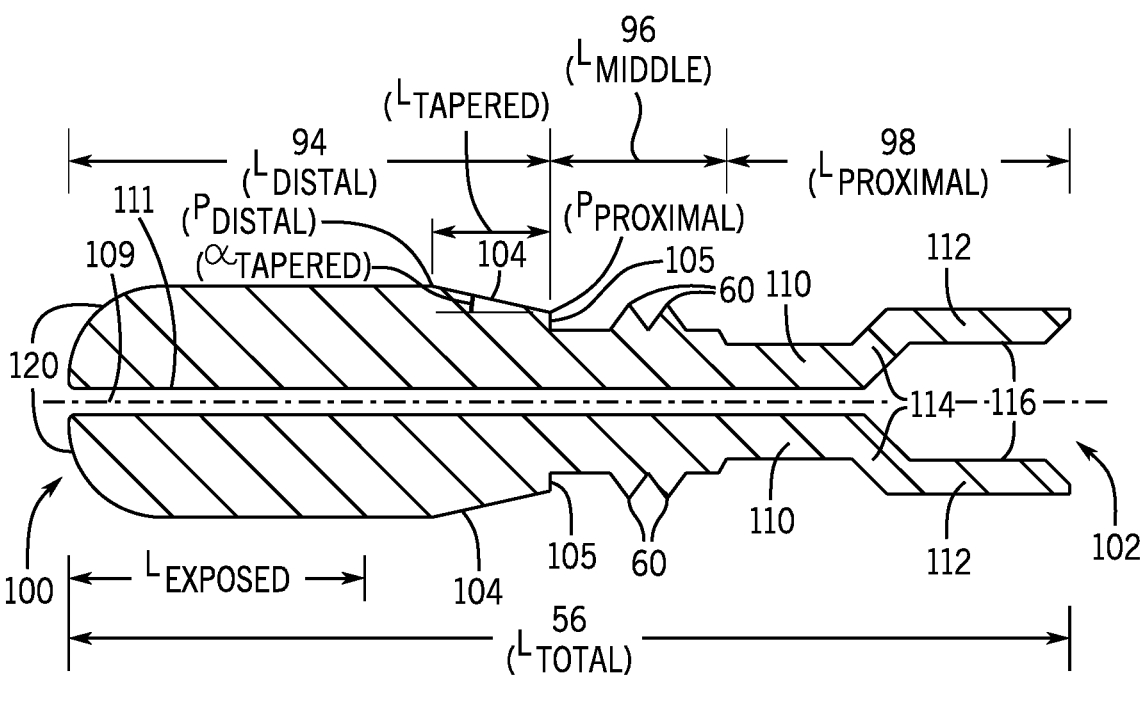
FIG. 5 is a cross-sectional side view of a contact tip of FIG. 3, in accordance with an embodiment.

As described above, in certain embodiments, the contact tip 56 includes external threading 60 that mates with internal threading 62 of the gas diffuser 58 such that the contact tip 56 may be secured within the welding torch 16 by creating a locking, threaded connection between the contact tip 56 and the gas diffuser 58. It is noted that the external threading 60 of the contact tip 56 is not disposed near an axial end of the contact tip 56. Rather, the external threading 60 is disposed near a center portion of the contact tip 56. FIG. 5 is a cross-sectional side view of the contact tip 56 of FIG. 3. As illustrated, in certain embodiments, the contact tip 56 includes a non-threaded distal end portion 94, an externally threaded middle portion 96, and a non-threaded proximal end portion 98. The distal (e.g., downstream) axial end 100 of the contact tip 56 will be understood to be the axial end of the contact tip 56 that is nearest to the welding application (e.g., where the arc 24 is created), whereas the proximal (e.g., upstream) axial end 102 of the contact tip 56 will be understood to be the axial end of the contact tip 56 that is farthest away from the welding application (i.e., nearest to the gooseneck 46 of the welding torch 16).

In certain embodiments, an axial length $l_{distal}$ of the non-threaded distal end portion 94 of the contact tip 56 may

| be in a range of approximately 30%-approximately 50% (e.g., between approximately 35% and approximately 45%, or approximately 40%) of a total axial length $1_{total}$ of the contact tip 56, and an axial length $1_{proximal}$ of the non-threaded proximal end portion 98 of the contact tip 56 may be in a range of approximately 25%-approximately 45% (e.g., between approximately 30% and approximately 40%, or approximately 35%) of the total axial length $1_{total}$ of the contact tip 56. As such, in certain embodiments, an axial length $1_{middle}$ of the externally threaded middle portion 96 of the contact tip 56 may be in a range of approximately 15%-approximately 35% (e.g., between approximately 20% and approximately 30%, or approximately 25%) of the total axial length $1_{total}$ of the contact tip 56. Accordingly, in certain embodiments, the external threading 60 of the contact tip 56 may be disposed greater than approximately 25%, greater than approximately 30%, greater than approximately 35%, greater than approximately 40%, or greater than approximately 45%, of the total axial length $1_{total}$ of the contact tip 56 from the proximal axial end 102 of the contact tip 56 (i.e., at least the distance of the axial length $1_{proximal}$ of the non-threaded proximal end portion 98 of the contact tip 56).

Similarly, a tapered outer surface 104 of the contact tip 56, which is configured to abut a mating tapered inner surface 106 of the gas diffuser 58 when the contact tip 56 is threaded into the gas diffuser 58 (see, e.g., FIG. 3), may be disposed near a center portion of the contact tip 56. More specifically, the tapered outer surface 104 of the contact tip 56 may be located greater than approximately 50%, greater than approximately 55%, greater than approximately 60%, greater than approximately 65%, or greater than approximately 70%, of the total axial length $1_{total}$ of the contact tip 56 from the proximal axial end 102 of the contact tip 56 (i.e., at least the distance of the axial length $1_{proximal}$ of the non-threaded proximal end portion 98 of the contact tip 56 and the externally threaded middle portion 96 of the contact tip 56). A shoulder 105 connects the tapered outer surface 104 to the externally threaded middle portion 96.

Because of the relatively long axial length $1_{proximal}$ of the non-threaded proximal end portion 98 of the contact tip 56, the non-threaded proximal end portion 98 may be referred to as a "cooling tail". The gas diffuser 58 is configured such that when the contact tip 56 is installed within the gas diffuser 58, the non-threaded proximal end portion 98 of the contact tip 56 (the "cooling tail") protrudes into the welding gas stream and, as such, helps cool the contact tip 56 through convection during use, thereby helping the contact tip 56 perform better and last longer than conventional contact tips. For example, as illustrated by arrows 108 in FIG. 3, at least a portion of the gas flows between the contact tip 56 and the gas diffuser 58 from the proximal axial end 102 of the contact tip 56 along the non-threaded proximal end portion 98 of the contact tip 56 until the gas reaches gas-through ports 64 of the gas diffuser 58, at which point the gas enters the internal volume 72 formed between the welding nozzle 48 and the contact tip 56.

In certain embodiments, the external threading 60 and the exterior surfaces of the contact tip 56 that abut the gas diffuser 58 at axial locations downstream (i.e., distal) of the external threading 60 (e.g., including the tapered outer surface 104) are the only physical points of contact between the contact tip 56 and the gas diffuser 58 when the contact tip 56 is fully installed (e.g., threaded) into the gas diffuser 58 (i.e., the non-threaded proximal end portion 98 does not physically contact the gas diffuser 58 when the contact tip 56 is fully installed into the gas diffuser 58). In particular, the proximal axial end 102 of the contact tip 56 does not contact the gas diffuser 58 when the contact tip 56 is fully installed (e.g., threaded) into the gas diffuser 58. Having only the external threading 60 and the exterior surfaces of the contact tip 56 that abut the gas diffuser 58 at axial locations downstream (i.e., distal) of the external threading 60 (e.g., including the tapered outer surface 104), be the only physical points of contact between the contact tip 56 and the gas diffuser 58 prevents the non-threaded proximal end portion 98 of the contact tip 56 from serving as a means of electrical conduction from the gas diffuser 58 to the contact tip 56. Instead, electrical conduction from the gas diffuser 58 to the contact tip 56 occurs only at the threaded middle portion 96 and the tapered outer surface 104 of the non-threaded distal end portion 94 of the contact tip 56.

During the MIG welding process, electric current is transferred from the contact tip 56 to a welding electrode 18 that is continuously fed through an inner bore 111 of the contact tip 56. It has been found that a majority of this electric current transfer occurs towards the distal end portion 94 of the contact tip 56. By conducting electric current from the gas diffuser 58 to the contact tip 56 at axial locations at or near the distal end portion 94 of the contact tip 56, the overall electric current path from the gas diffuser 58 to the welding electrode 18 is shortened. This shortened path helps to reduce resistive heating generated within the contact tip 56 during the transfer of current from the gas diffuser 58 to the welding electrode 18. As described herein, this current transfer path does not include the non-threaded proximal end portion 98 (i.e., the "cooling tail") of the contact tip 56. The non-threaded proximal end portion 98 (i.e., the "cooling tail") thus primarily serves to help cool the contact tip 56 via convective heat transfer from the surfaces of the non-threaded proximal end portion 98 to the welding gas as it flows over these surfaces. Another feature of the embodiments of the contact tip 56 and gas diffuser 58 described herein is that the gas diffuser 58 helps shield the non-threaded proximal end portion 98 of the contact tip 56, the threaded middle portion 96 of the contact tip 56, and at least a part of the tapered outer surface 104 of the non-threaded distal end portion 94 of the contact tip 56 from heat generated by the welding arc 24. Specifically, as illustrated in FIG. 3, only a portion of the non-threaded distal end portion 94 of the contact tip 56 is external to the gas diffuser 58 when the contact tip 56 is installed within the gas diffuser 58.

More specifically, as illustrated in FIG. 5, only a certain axial length $1_{exposed}$ of the non-threaded distal end portion 94 of the contact tip 56 is external to the gas diffuser 58 when the contact tip 56 is installed within the gas diffuser 58. For example, in certain embodiments, the axial length $1_{exposed}$ of the non-threaded distal end portion 94 of the contact tip 56 that is external to the gas diffuser 58 when the contact tip 56 is installed within the gas diffuser 58 may be in a range of approximately 20%-approximately 40% (e.g., between approximately 25% and approximately 35%, or approximately 30%) of the total axial length $1_{total}$ of the contact tip 56. In addition, in certain embodiments, the axial length $1_{exposed}$ of the non-threaded distal end portion 94 of the contact tip 56 that is external to the gas diffuser 58 when the contact tip 56 is installed within the gas diffuser 58 may be in a range of approximately 50%-approximately 70% (e.g., between approximately 55% and approximately 65%, or approximately 60%) of the axial length $1_{distal}$ of the non-threaded distal end portion 94 of the contact tip 56. Furthermore, it is noted that the surface area 120 of the contact tip 56 includes a rounded outer surface at the distal axial end 100 of the contact tip 56, further minimizing exposure to the welding arc 24. By limiting this exposed surface area 120 of the contact tip 56, less radiant heat is absorbed into the contact tip 56, thereby extending the life of the contact tip 56.

As such, the gas diffuser 58 shields the portion of the non-threaded distal end portion 94 of the contact tip 56 that is not within the exposed axial length $l_{exposed}$ of the non-threaded distal end portion 94 from heat generated by the welding arc 24. In certain embodiments, as illustrated in FIG. 5, an axial length $l_{tapered}$ of the tapered outer surface 104 of the contact tip 56 may be in a range of approximately 5%-approximately 25% (e.g., between approximately 10% and approximately 20%, or approximately 15%) of the total axial length $l_{total}$ of the contact tip 56. In addition, in certain embodiments, the Moral axial length $l_{tapered}$ of the tapered outer surface 104 of the contact tip 56 may be in a range of approximately 15%-approximately 35% (e.g., between approximately 20% and approximately 30%, or approximately 25%) of the total axial length $l_{distal}$ of the non-threaded distal end portion 94 of the contact tip 56.

It should be noted that, while the embodiments illustrated in FIGS. 3 and 5 include an exposed axial length $l_{exposed}$ of the non-threaded distal end portion 94 that is less than the total axial length $l_{distal}$ of the non-threaded distal end portion 94 minus the axial length $l_{tapered}$ of the tapered outer surface 104, in other embodiments (see, e.g., FIG. 7A), the exposed axial length $l_{exposed}$ of the non-threaded distal end portion 94 may be greater than the total axial length $l_{distal}$ of the non-threaded distal end portion 94 minus the axial length $l_{tapered}$ of the tapered outer surface 104. In other words, while the embodiments illustrated in FIGS. 3 and 5 include a tapered outer surface 104 of the contact tip 56 that mates with the tapered inner surface 106 of the gas diffuser 58 internal to the gas diffuser 58 (e.g., with a substantially constant inner diameter of the gas diffuser 58 at the front axial end 146 of the gas diffuser 58), in other embodiments (see, e.g., FIG. 6), the tapered inner surface 106 of the gas diffuser 58 may be disposed at the front axial end 146 of the gas diffuser 58 such that the tapered outer surface 104 of the contact tip 56 may extend slightly outside of the gas diffuser 58 when the contact tip 56 is fully installed (e.g., threaded) into the gas diffuser 58.

As illustrated in FIG. 5, in certain embodiments, the tapered outer surface 104 of the contact tip 56 (as well as the mating tapered inner surface 106 of the gas diffuser 58) may include a taper that increases in diameter from the shoulder 105 of the contact tip 56 toward the distal axial end 100 of the contact tip 56. For example, in certain embodiments, the tapered outer surface 104 of the contact tip 56 may increase in diameter from proximal end points $p_{proximal}$ (i.e., that transitions the tapered outer surface 104 to the shoulder 105) to distal end points $p_{distal}$ (i.e., that transitions the tapered outer surface 104 into an adjacent, downstream portion of the non-threaded distal end portion 94 of the contact tip 56. More specifically, in certain embodiments, an angle $\alpha_{tapered}$ formed from the proximal end points $p_{proximal}$ to the distal end points $p_{distal}$ relative to a central longitudinal axis 109 may be in a range of approximately 5 degrees-approximately 15 degrees (e.g., between approximately 8 degrees and approximately 12 degrees, or approximately 10 degrees). It will be appreciated that, when described herein, axial lengths of components are defined as lengths along longitudinal axes for the respective components. For example, the axial length $l_{tapered}$ of the tapered outer surface 104 of the contact tip 56 is defined as the length along the longitudinal axis 109 between the proximal end points $p_{proximal}$ and the distal end points $p_{distal}$ of the tapered outer surface 104.

Although illustrated in FIGS. 3 and 5 as having a tapered outer surface 104 that is substantially linear from the proximal end points $p_{proximal}$ to the distal end points $p_{distal}$, in other embodiments, the contact tip 56 may include a tapered outer surface 104 that is not substantially linear, but which may include various shapes and contours, such as convex curved outer surfaces, concave curved outer surfaces, stepped linear outer surfaces, stepped curved outer surfaces, or some combination thereof. Regardless of the specific shape or contour, the tapered outer surface 104 of the contact tip 56, through its interaction with the mating tapered inner surface 106 of the gas diffuser 58, aid in the alignment (e.g., concentricity) of the contact tip 56 when it is installed (e.g., threaded) into the gas diffuser 58.

Returning now to FIG. 5, in certain embodiments, the non-threaded proximal end portion 98 of the contact tip 56 may include first and second portions 110, 112 connected by an angled connecting portion 114. The first portion 110 may be directly connected to the threaded middle portion 96 of the contact tip 56, and generally has substantially similar (or, indeed, identical) inner and outer diameters as the threaded middle portion 96 (e.g., the outer diameter from which the threads 60 extend radially from the middle portion 96 may be substantially similar, or identical, to the outer diameter of the first portion 110), whereas the second portion 112 is disposed at the proximal axial end 102 of the contact tip 56 and has inner and outer diameters that are substantially larger (e.g., greater than 100%, greater than 150%, greater than 200%, or even larger, in certain embodiments) than the first portion 110, necessitating the angled connecting portion 114 between the first and second portions 110, 112.

Figure 6:
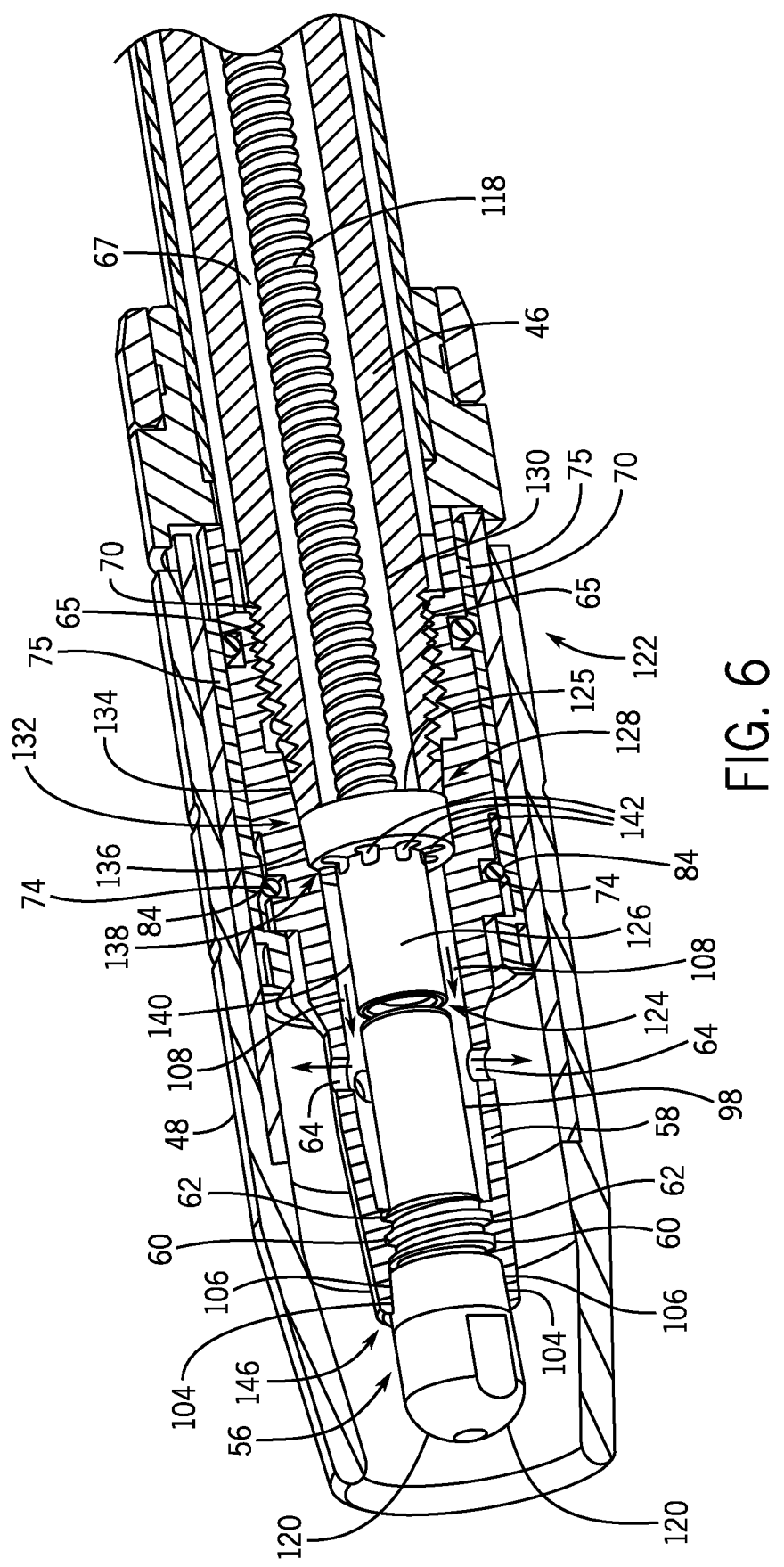
FIG. 6 is a cross-sectional perspective view of a portion of the welding torch of FIG. 2, in accordance with an embodiment.

The internal bore 116 created by the second portion 112 of the non-threaded proximal end portion 98 is configured to be large enough to facilitate insertion of a welding torch liner 118, as illustrated in FIG. 3. The welding torch liner 118 provides a conduit through which the wire electrode 18 may travel to the contact tip 56. In conventional welding torches, the welding torch liners are either not in contact with the contact tip, or simply abut against a proximal end of the contact tip. In contrast, the embodiments illustrated in FIGS. 3 and 5 allow the welding torch liner 118 to fit inside the internal bore 116 created by the second portion 112 of the non-threaded proximal end portion 98, maintaining better concentricity between the welding torch liner 118 and the contact tip 56, and thereby improving feedability of the wire electrode 18. In other embodiments, the welding torch liner 118 may abut against the proximal axial end 102 of the contact tip 56. In yet other embodiments (e.g., as shown in FIG. 6), the welding torch liner 118 may be adapted on a first axial end 124 with a liner stop 126. In certain embodiments, the gas diffuser 58 may be configured internally to interact with the liner stop 126 such that the welding torch liner 118 may not abut, reside within, nor be in any physical contact with the proximal axial end 102 of the contact tip 56. As such, the installation and removal of the contact tip 56 may be made easier in that the welding torch liner 118 may not exert any axial or counter-rotational forces against the proximal axial end 102 of the contact tip 56. In certain embodiments, as described herein, the gas diffuser 58 may also be configured internally to interact with the liner stop 126 such that the welding torch liner 118 maintains better concentricity between the welding torch liner 118 and the contact tip 56. Indeed, in certain embodiments, the liner stop 126 may be integral to the gas diffuser 58. In other words, the features of the liner stop 126, as described herein, may be part of the gas diffuser 58 in embodiments where the liner stop 126 and the gas diffuser 58 are integrated into a single component.

In conventional MIG welding systems, several different design types of liner assemblies are used to install welding torch liners in the welding torches. For example, in a first conventional design type (i.e., which may be referred to as rear load, captured end/free end liners), it is common for a liner assembly to be adapted on one axial end with a "stop", with the other axial end being unadapted. In such systems, the welding torch liner is often installed into the welding torch via a rear connector of the welding torch (often referred to as "rear load"). In general, such rear connectors facilitate attachment of the welding torch to a welding machine and/or wire feeder, as well as locating and aligning a liner assembly with the drive rolls of the wire feeder that deliver welding wire to the welding torch. In such conventional systems, the liner assembly is fed into the rear connector (e.g., located at a rear axial end of a gooseneck of the welding torch) of the welding torch until it is stopped by the liner stop. The liner stop locates and aligns the liner assembly within the rear connector of the welding torch, and provides a means with which to retain the liner assembly in the welding torch. In certain such designs, the liner stop may be retained within the rear connector of the welding torch via a threaded connection between the liner stop and the rear connector of the welding torch, or by a retaining "cap" that installs over the liner stop and threads to the rear connector of the welding torch. Another such design retains the liner stop within the rear connector of the welding torch by tightening a locking screw located in the rear connector of the welding torch, such that it applies a radial force to the liner assembly. This retained end of the welding torch liner may be referred to as being "captured". The opposite, unadapted axial end of the liner assembly commonly protrudes from the front axial end of the gooseneck, and must be trimmed to a specific length before installation of a gas diffuser and/or contact tip into the welding torch. In such designs, the gas diffuser usually has a shoulder or seat area to accept this front axial end of the welding torch liner. This gas diffuser feature prevents the front axial end of the welding torch liner from moving axially towards the contact tip once the gas diffuser is installed, but does not prevent the front axial end of the welding torch liner from moving axially away or radially off-center. As such, the front axial end of the welding torch liner may be considered "free".

In general, the length at which the welding torch liner is trimmed is very important for proper functioning of the welding torch. In particular, it is important to keep the front axial end of the welding torch liner as close to the rear axial end of the contact tip as possible. A welding torch liner that is cut too short may create problems feeding welding wire into the contact tip and, thus, affect the quality of the resulting weld.

As described above, to trim the welding torch liner in such conventional designs, the gas diffuser and/or and the contact tip must be removed from the gooseneck. The correct cut location often varies from one consumable design to another, so one must first verify the trim length required. Next, this trim length must be measured via some tool/instrument/device while the torch cable 42 is laying straight and untwisted. In general, it is relatively difficult to hold the welding torch in such a position while at the same time using a measuring device and marking a cut location. As a result, many users do not want to bother going through all this work and just visually estimate the length, cut the welding torch liner, and re-install the gas diffuser and/or contact tip.

Various methods and devices have been developed to ease the measuring/cutting process, but it still remains relatively difficult to do correctly. In addition, with the gas diffuser and/or contact tip re-installed, there is no way to verify whether or not the user has trimmed the welding torch liner too short. More specifically, the user cannot see the free (front axial) end of the welding torch liner because it is hidden inside the gas diffuser.

A common phenomenon which occurs with rear load, captured end/free end MIG welding torch designs is referred to as "liner retraction". As the torch cable 42 is coiled, bent, and twisted during normal use, the free (front axial) end of the welding torch liner tends to retract into the gooseneck and away from the rear axial end of the contact tip. To combat this, the welding torch liner is often trimmed to a length that is a little longer than needed while the torch cable 42 is somewhat straight and not twisted. Often, though, this extra length is still not enough to prevent the welding torch liner from retracting away from the contact tip as the torch cable 42 is moved around. When this happens, it is essentially the same as if the welding torch liner were trimmed too short to begin with, and wire feeding problems will arise and affect the quality of the weld.

Besides liner retraction, another problem with rear load, captured end/free end MIG welding torch designs is misalignment of the free (front axial) end of the welding torch liner with the contact tip. Perhaps just as important as keeping the front axial end of the welding torch liner close to the contact tip, it is also important to keep the two parts aligned (e.g., concentrically). As the welding wire exits the welding torch liner and enters the contact tip, any radial misalignment between the welding torch liner and the contact tip may cause resistance to movement of the welding wire. This resistance can cause wire feeding problems that may again affect the quality of the resulting weld. Such misalignment may also lead to premature wear and reduced life of the contact tip. As described above, it is common for gas diffusers to have an internal shoulder or seat area to accept the front axial end of the welding torch liner. Due to the desire for "universal fit" gas diffusers that accept various sized welding torch liners (e.g., having varying outside diameters), the seat area of such gas diffusers is usually of a diameter much larger than the outer diameter of most welding torch liners, thereby often causing the front axial end of the welding torch liner to sit out-of-alignment with the contact tip.

In a second conventional design type (i.e., which may be referred to as rear load, captured end/captured end liners), a locking screw is used to secure the liner assembly in place at its unadapted axial end to prevent axial movement of the welding torch liner (i.e., liner retraction). As such, the welding torch liner is captured on both axial ends of the welding torch liner. In such designs, the locking screw is often located within the gas diffuser, or in the torch handle. These designs are typically "rear load", similar to the aforementioned rear load, captured end/free end MIG welding torch designs. In addition, in such designs, the opposite (i.e., front axial) end of the liner assembly protrudes from the gooseneck after installation into the rear connector and must be trimmed to a specific length to place it as close as possible to the contact tip. Again, the length at which the welding torch liner is trimmed is very important for proper functioning of the welding torch. A welding torch liner that is cut too short may create problems feeding welding wire into the contact tip and, thus, affect the quality of the resulting weld being created. As such, it is very important to keep the front axial end of the welding torch liner as close to the rear axial end of the contact tip as possible. Also, as in the rear load, captured end/free end liners, when the gas diffuser and/or the contact tip is re-installed, there is no way to verify whether or not the user has trimmed the welding torch liner too short. More specifically, the user cannot see the free (front axial) end of the welding torch liner because it is hidden inside the gas diffuser.

While liner retraction is not an issue for rear load, captured end/captured end MIG welding torch designs (as it is with rear load, captured end/free end MIG welding torch designs), welding torch liner misalignment (e.g., radial misalignment) with the contact tip may be. As described above, there is a desire for "universal fit" gas diffusers that accept various sized welding torch liners. This results in gas diffusers with liner seat areas that are often much larger than the outer diameter of the welding torch liner used. While a locking screw may prevent liner retraction, it does nothing to aid (and, in fact, may worsen) radial alignment of the welding torch liner and the contact tip. When the locking screw is located in the gas diffuser, the act of tightening the locking screw against the welding torch liner forces the welding torch liner off-center from the contact tip.

Additional problems may arise when the locking screw resides in the gas diffuser. In such designs, removing and replacing a gas diffuser becomes more difficult as the user has to remember to loosen the locking screw from against the welding torch liner before the gas diffuser may be removed. Another problem with this design is that the locking screw is often exposed to the welding arc environment, which is extremely hot, with molten metal "spatter" flying about and attaching to the welding torch components. This spatter may adhere to surfaces of the locking screw that interact with the tool used for loosening/tightening the locking screw. This can make it difficult, or even impossible, to loosen the locking screw after use of the welding torch. Furthermore, the heat from the welding arc may cause the locking screw and mating gas diffuser threads to temporarily change size when hot, creating a "bind" between the two parts that makes loosening/tightening the locking screw more difficult.

In designs where the locking screw is located in the handle of the welding torch, a separate problem may occur. For example, MIG welding torches sold in Europe are required to meet certain specifications ("CE"), one of which deals with exposed, electrically "live" components within the handle of welding torches. The CE standard dictates a maximum orifice size in a handle of a welding torch to limit the chances of a user getting shocked. Since the locking screw is in direct contact with the welding torch liner, the locking screw is "live" during the welding process. As such, in most designs, the locking screw located in the handle of the welding torch requires an access hole for a tightening/loosening tool, and often this access hole may exceed the CE specifications.

In a third conventional design type (i.e., which may be referred to as front load, free end/free end liners), the welding torch liner installs via the gooseneck of the welding torch (i.e., from a front axial end of the gooseneck), rather than via a rear connector of the welding torch. This is often referred to as "front load". In such designs, the welding torch liner is adapted on one axial end (i.e., a rear axial end) to mate with a receiver in the rear connector of the welding torch. The welding torch liner is fed into the gooseneck of the welding torch until the adapter ends "bottoms" in the receiver of the rear connector of the welding torch. The receiver is affixed to the rear connector, but the welding torch liner is not captured by the receiver. As such, the receiver keeps the adapted end (i.e., the rear axial end) of the welding torch liner from moving axially out of the rear connector towards the wire feed drive rolls (i.e., away from the contact tip and gas diffuser), but does not prevent axial movement in the opposite axial direction (i.e., toward the contact tip and the gas diffuser). Such designs do, however, keep the welding torch liner centered (e.g., radially) within the rear connector. As such, the adapted end (i.e., the rear axial end) of the welding torch liner may experience liner retraction back into the torch cable 42, similar to how a rear load, captured end/free end liner design may enable liner retraction in the gooseneck. For this reason, this adapter end of the welding torch liner may be considered "free".

In certain such designs, the receiver in the rear connector of the welding torch may be spring-loaded. As such, the welding torch liner again has an adapted end to mate with the receiver of the rear connector of the welding torch. In such designs, the welding torch liner is fed into the gooseneck (i.e., from a front axial end of the gooseneck) until the welding torch liner engages with the receiver in the rear connector of the welding torch. At this point, further insertion of the welding torch liner into the welding torch causes compression of a biasing spring located behind the receiver. The welding torch liner may be inserted to a point that the spring can no longer be compressed. In general, the spring and receiver are often affixed to the rear connector, but the receiver is free to move axially. Again, in such designs, the adapted end of the welding torch liner is not captured by the receiver or the spring, so the adapted end of the welding torch liner may experience liner retraction back into the torch cable 42. For this reason, this adapted end of the welding torch liner may also be considered "free".

In both of these designs, the opposite (i.e., front axial) end of the welding torch liner is unadapted, and protrudes from the gooseneck end of the welding torch. This axial end of the welding torch liner must be trimmed to a specific length before installation of a gas diffuser and/or contact tip. In such designs, the gas diffuser usually has a shoulder or seat area to accept this axial end of the welding torch liner. This gas diffuser feature prevents the welding torch liner from moving axially towards the contact tip, but does not prevent the welding torch liner from moving axially away from the contact tip or radially off-center. As such, this end of the welding torch liner may also be considered "free".

As described above, in general, the length at which the welding torch liner is trimmed is very important for proper functioning of the welding torch. In particular, it is important to keep the front axial end of the welding torch liner as close to the rear axial end of the contact tip as possible. A welding torch liner that is cut too short may create problems feeding welding wire into the contact tip and, thus, affect the quality of the resulting weld. Also, as in the rear load designs, when the gas diffuser and/or contact tip are re-installed, there is no way to verify whether or not the user has trimmed the welding torch liner too short. More specifically, the user cannot see the free end of the welding torch liner because it is hidden inside the gas diffuser. In addition, the front load, free end/free end liner designs are also subject to liner retraction into the gooseneck of the welding torch and liner-to-contact tip misalignment.

Other problems exist with these front load, free end/free end liner designs. For example, determining if the adapted end of welding torch liner has actually mated with the receiver in the rear connector of the welding torch can be difficult as there is no way to visually inspect for engagement. The adapted end of the welding torch liner and the receiver are both hidden inside the rear connector. In general, the user must assume that when the welding torch liner can no longer be urged into the gooseneck, it has successfully mated with the receiver. If the adapted end of the welding torch liner has not mated and the welding torch is used, wire feeding problems may develop and affect the resulting weld.

An additional problem is presented by the design with the spring-loaded receiver. The intent of such design is to use compression of a biasing spring to apply a constant axial force upon the welding torch liner in a direction towards the gas diffuser in order to combat liner retraction into the gooseneck. The problem is that in order for this concept to work properly, the liner assembly must be pushed into the welding torch until the receiver spring has been fully compressed, then the welding torch liner must be trimmed to a specific length while holding it against the spring biasing force. However, it can be difficult to determine if the spring is fully compressed while the welding torch liner is trimmed, again due to the fact that the receiver and spring are hidden inside the rear connector in such designs.

Embodiments of the present disclosure are intended to address the shortcomings of the three conventional liner designs described above (i.e., rear load, captured end/free end liner designs, rear load, captured end/captured end liner designs, and front load, free end/free end liner designs). The embodiments of the present disclosure may be referred to as a front load, captured end/captured end liner design. The front load, captured end/captured end liner embodiments described herein may have certain synergies with the cooling tail contact tip designs described herein with respect to FIGS. 3-5. However, it should be noted that the front load, captured end/captured end liner embodiments described herein may be used with other types of contact tips (e.g., not just with the cooling tail contact tip 56 illustrated in FIGS. 3-5).

FIG. 6 is a cross-sectional perspective view of a portion of the welding torch 16 of FIG. 2 in certain embodiments. The embodiment illustrated in FIG. 6 is substantially similar to the embodiment illustrated in FIG. 3. However, FIG. 6 illustrates a portion of a welding torch liner assembly 122 in accordance with embodiments of the present disclosure. The welding torch liner assembly 122 described herein includes a welding torch liner 118 that is adapted with a liner stop 126 on a first (front) axial end 124, but unadapted at a second, opposite (rear) axial end. The liner stop 126 is mechanically affixed to the first axial end 124 of the welding torch liner 118. The welding torch liner 118 is fed into the gooseneck 46 of the welding torch 16 (with the unadapted axial end of the welding torch liner 118 fed first in an axial direction toward a rear end of the welding torch 16) until the liner stop 126 abuts a front axial end 128 of the gooseneck 46. As such, the liner stop 126 protrudes from the front axial end 128 of the gooseneck 46 similar to how unadapted liner ends protrude in the conventional liner designs described above.

The difference from conventional liner designs is that the adapted axial end 124 of the welding torch liner 118 does not get trimmed. As described above with respect to the conventional liner designs, the distance the welding torch liner protrudes from the front axial end of the gooseneck is very important for proper functioning of a welding torch. In general, the idea is to have the front axial end of the welding torch liner as close as possible to the contact tip. As described above, such conventional liner designs rely on the user to measure and trim the front axial end of the welding torch liner to the critical length. In contrast, in the present embodiments, the liner stop 126 is precisely machined to its critical length. The user simply inserts the welding torch liner 118 into the gooseneck 46 until a rear axial end 125 of the liner stop 126 abuts the front axial end 128 of the gooseneck 46, then the user installs the gas diffuser 58 over the liner stop 126 (and the contact tip 56). The present embodiments obviate the need for the user to assume that the liner protrusion length is correct.

In addition, the liner stop 126 provides a means with which to capture the adapted axial end 124 of the welding torch liner 118. In certain embodiments, the liner stop 126 is larger in diameter (e.g., at the rear axial end 125 of the liner stop 126) than an internal bore 130 of the gooseneck 46 such that the liner stop 126 prevents the welding torch liner 118 from retracting (e.g., axially toward a rear portion of the welding torch 16) into the gooseneck 46. In certain embodiments, an internal bore 132 of the gas diffuser 58 is configured to abut both an external surface 134 of the gooseneck 46 at the front axial end 128 of the gooseneck 46 and a first external surface 136 (as a rear axial portion) of the liner stop 126 at the rear axial end 125 of the liner stop 126 when the gas diffuser 58 is installed in the welding torch 16 over the contact tip 56 and the liner stop 126. In addition, in certain embodiments, the internal bore 132 of the gas diffuser 58 is configured to mate with a shoulder 138 of the liner stop 126, which is formed at a generally orthogonal transition from the first external surface 136 of the liner stop 126 and a second external surface 140 (as a front axial portion) of the liner stop 126 that has a smaller outer diameter than the first external surface 136 of the liner stop 126, when the gas diffuser 58 is installed in the welding torch 16 over the contact tip 56 and the liner stop 126.

These internal spatial features of the gas diffuser 58 limit axial movement (e.g., less than 2 mm, less than 1 mm, less than 0.5 mm, less than 0.1 mm, or even less axial movement, in certain embodiments) of the liner stop 126 back toward the contact tip 56 when the gas diffuser 58 is installed in the welding torch 16 over the contact tip 56 and the liner stop 126. In addition, these internal spatial features of the gas diffuser 58 limit radial movement (e.g., less than 2 mm, less than 1 mm, less than 0.5 mm, less than 0.1 mm, or even less radial movement, in certain embodiments) of the liner stop 126, thus keeping the welding torch liner 118 centered radially with respect to the contact tip 56. However, in certain embodiments, the liner stop 126 may be configured to freely rotate with 360° of full rotational movement with respect to the gas diffuser 58 and the gooseneck 46. As such, the adapted axial end 124 of the welding torch liner 118 is considered "captured". In other words, the adapted axial end 124 of the welding torch liner 118 is not able to retract into the gooseneck 46 (i.e., axially rearward), move towards the contact tip 56 (i.e., axially forward), or to sit radially off-center with respect to the contact tip 56. The length that the adapted axial end 124 of the welding torch liner 118 protrudes from the gooseneck 46 is always correct as it is precisely machined into the liner stop 126. As described above, in certain embodiments, the liner stop 126 may be integral to the gas diffuser 58. In other words, the features of the liner stop 126, as described herein, may be part of the gas diffuser 58 in embodiments where the liner stop 126 and the gas diffuser 58 are integrated into a single component.

In addition to illustrating an embodiment of the gas diffuser 58 that is configured to cooperate with the liner stop 126 of the welding torch liner assembly 122 described herein, FIG. 6 also illustrates an embodiment of the contact tip 56 that is different than the embodiment of the contact tip 56 illustrated in FIGS. 3 and 5. In general, the contact tip 56 illustrated in FIG. 6 is also configured to cooperate with the liner stop 126 of the welding torch liner assembly 122 described herein. In this embodiment, again, the contact tip 56 includes external threading 60 that mates with internal threading 62 of the gas diffuser 58 such that the contact tip 56 may be secured (e.g., mechanically affixed) within the welding torch 16 (e.g., to the gooseneck 46 via the gas diffuser 58) by creating a locking, threaded connection between the contact tip 56 and the gas diffuser 58. Again, the external threading 60 of the contact tip 56 is not disposed near an axial end of the contact tip 56. Rather, the external threading 60 is disposed near a center portion of the contact tip 56.

Figure 7A:
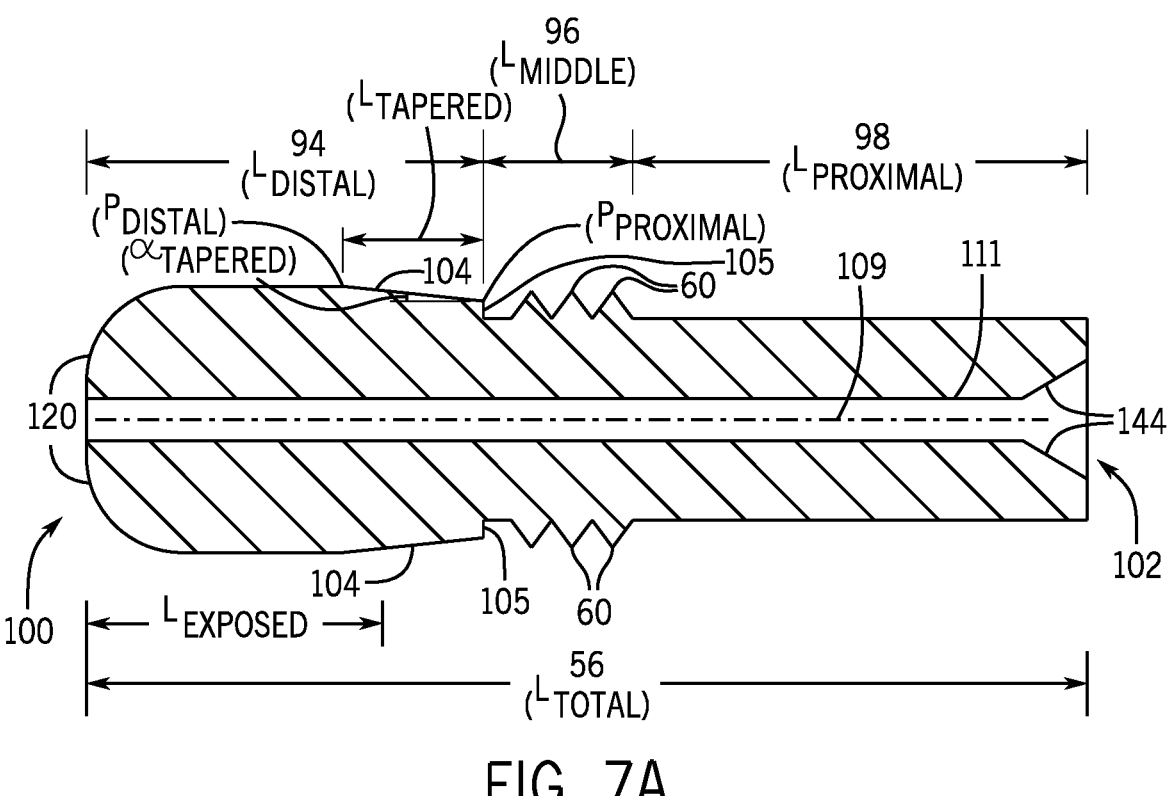
FIGS. 7A through 7I are various views of a contact tip of FIG. 6, in accordance with an embodiment.
Figure 7B:
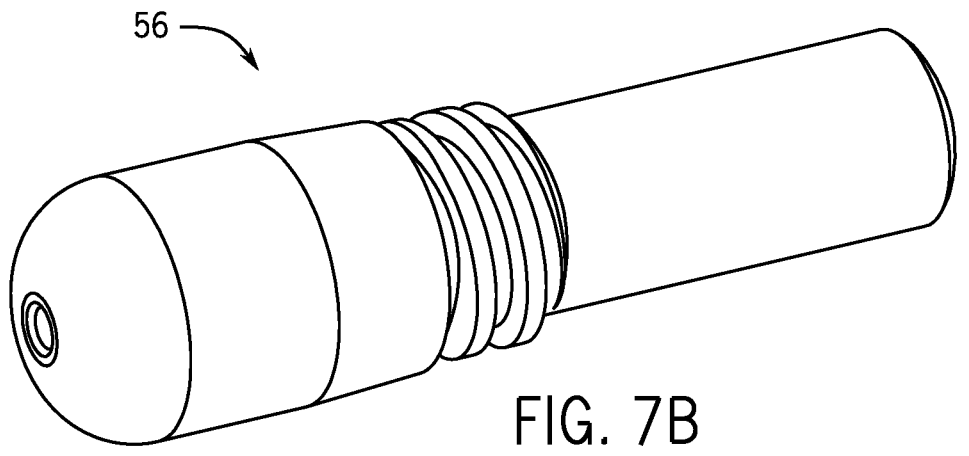
Figure 7C:
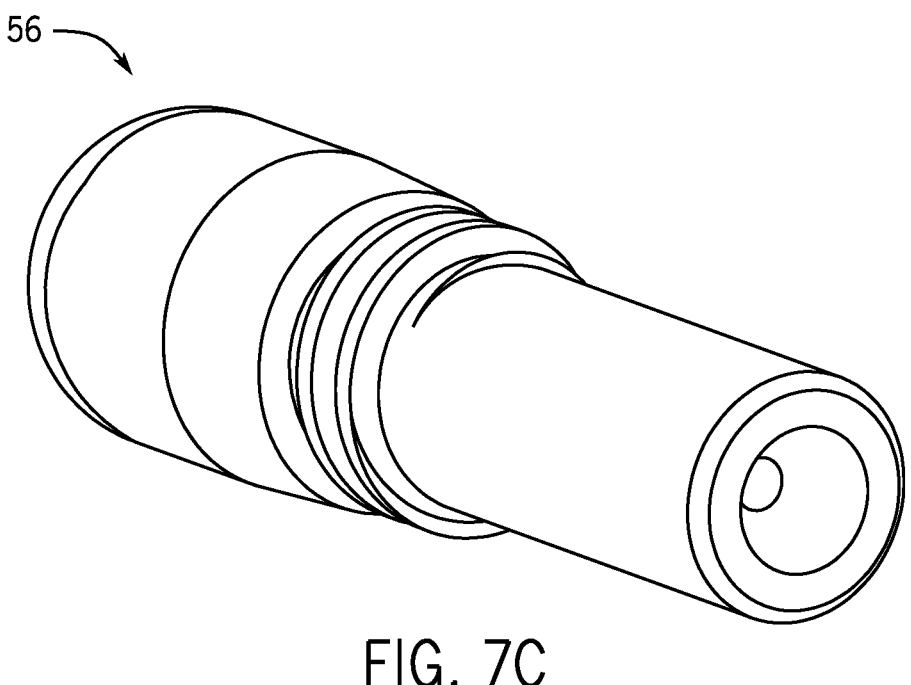
Figure 7D:
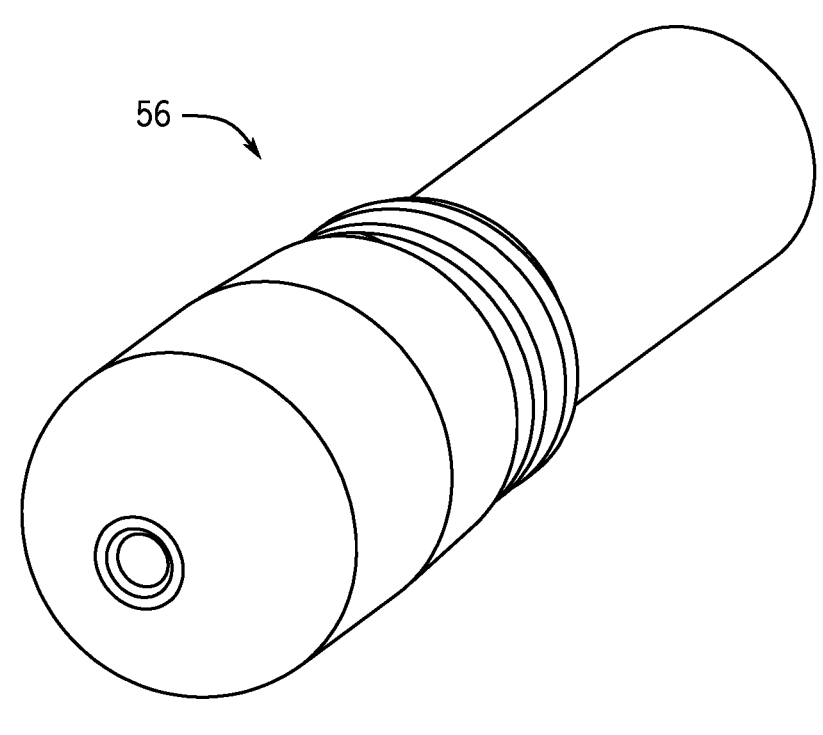
Figure 7E:
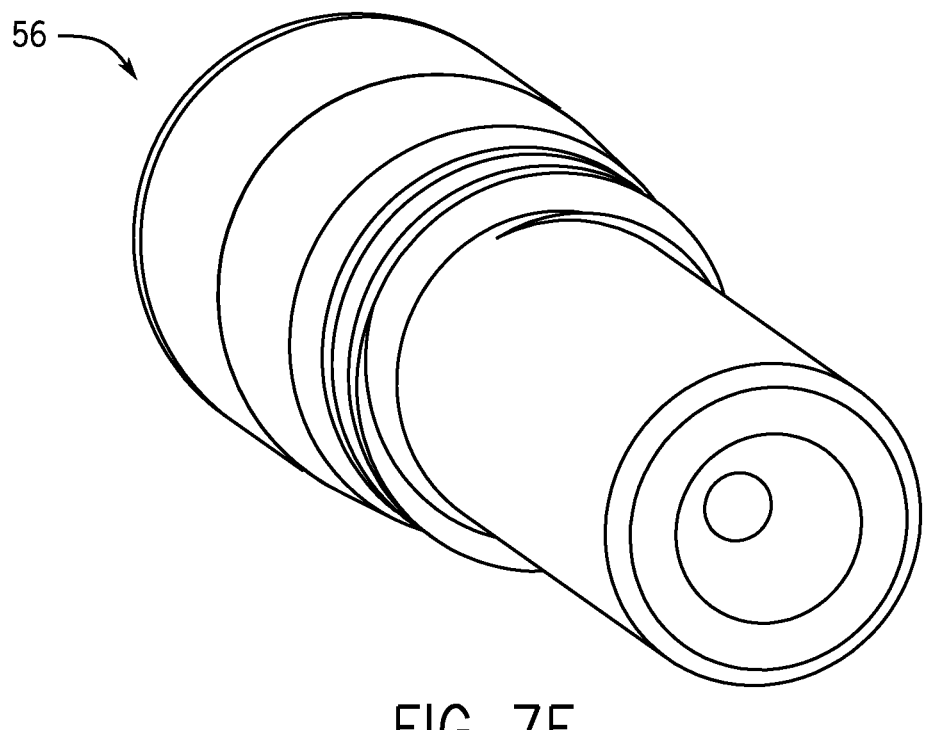
Figure 7F:
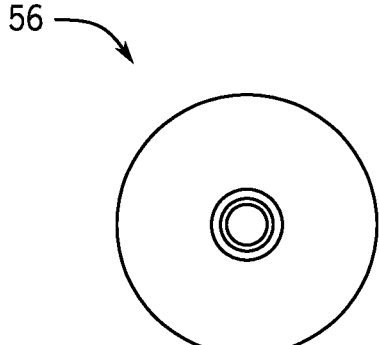
Figure 7G:
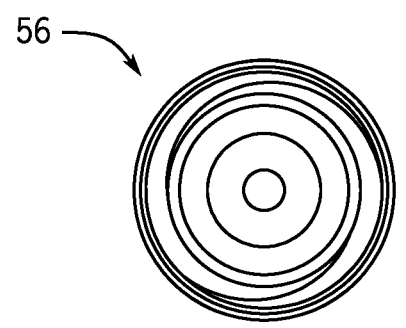
Figures 7H, 7I:
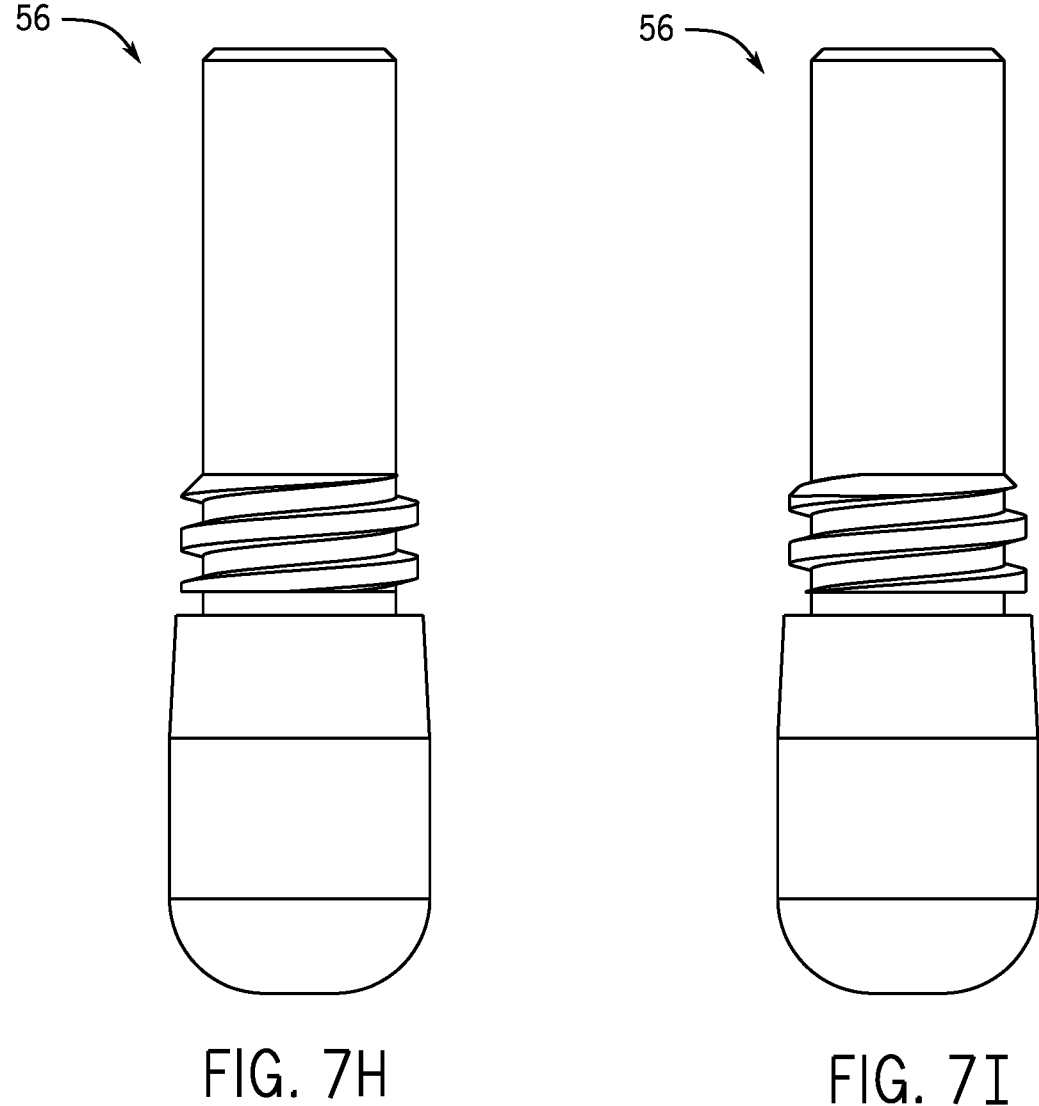

FIG. 7A is a cross-sectional side view of the contact tip 56 of FIG. 6. As illustrated, in certain embodiments, the contact tip 56 includes a non-threaded distal end portion 94, an externally threaded middle portion 96, and a non-threaded proximal end portion 98, similar to the embodiment illustrated in FIGS. 3 and 5. In certain embodiments, the axial length $l_{distal}$ of the non-threaded distal end portion 94 of the contact tip 56 may be in a range of approximately 30%-approximately 50% (e.g., between approximately 35% and approximately 45%, or approximately 40%) of the total axial length $l_{total}$ of the contact tip 56, and the axial length $l_{proximal}$ of the non-threaded proximal end portion 98 of the contact tip 56 may be in a range of approximately 35%-approximately 55% (e.g., between approximately 40% and approximately 50%, or approximately 45%) of the total axial length $l_{total}$ of the contact tip 56. As such, in certain embodiments, the axial length $l_{middle}$ of the externally threaded middle portion 96 of the contact tip 56 may be in a range of approximately 10%-approximately 25% (e.g., between approximately 10% and approximately 20%, or approximately 15%) of the total axial length $l_{total}$ of the contact tip 56. Accordingly, in certain embodiments, the external threading 60 of the contact tip 56 may be disposed greater than approximately 35%, greater than approximately 40%, greater than approximately 45%, greater than approximately 50%, or greater than approximately 55%, of the total axial length $l_{total}$ of the contact tip 56 from the proximal axial end 102 of the contact tip 56 (i.e., at least the distance of the axial length $l_{proximal}$ of the non-threaded proximal end portion 98 of the contact tip 56).

The tapered outer surface 104 of the contact tip 56 may be located greater than approximately 50%, greater than approximately 55%, greater than approximately 60%, greater than approximately 65%, or greater than approximately 70%, of the total axial length $l_{total}$ of the contact tip 56 from the proximal axial end 102 of the contact tip 56 (i.e., at least the distance of the axial length $l_{proximal}$ of the non-threaded proximal end portion 98 of the contact tip 56 and the externally threaded middle portion 96 of the contact tip 56).

As with the embodiment illustrated in FIGS. 3 and 5, because of the relatively long axial length $l_{proximal}$ of the non-threaded proximal end portion 98 of the contact tip 56, the non-threaded proximal end portion 98 may be referred to as a "cooling tail". The gas diffuser 58 is configured such that when the contact tip 56 is installed within the gas diffuser 58, the non-threaded proximal end portion 98 of the contact tip 56 (the "cooling tail") protrudes into the welding gas stream and, as such, helps cool the contact tip 56 through convection during use, thereby helping the contact tip 56 perform better and last longer than conventional contact tips. For example, as illustrated by arrows 108 in FIG. 6, at least a portion of the gas flows between the contact tip 56 and the gas diffuser 58 from the proximal axial end 102 of the contact tip 56 along the non-threaded proximal end portion 98 of the contact tip 56 until the gas reaches gas-through ports 64 of the gas diffuser 58, at which point the gas enters the internal volume 72 formed between the welding nozzle 48 and the contact tip 56. One difference from the embodiment illustrated in FIG. 3 is that, as illustrated in FIG. 6, in certain embodiments, the liner stop 126 may include one or more ports 142 through which welding gas may flow between the contact tip 56 and the gas diffuser 58, as illustrated by arrows 108. Welding gas is thus allowed to travel from the interior volume 67 of the gooseneck 46 into the internal bore 132 of the gas diffuser 58.

Again, in general, the external threading 60 and the exterior surfaces of the contact tip 56 that abut the gas diffuser 58 at axial locations downstream (i.e., distal) of the external threading 60 (e.g., including the tapered outer surface 104) are the only physical points of contact between the contact tip 56 and the gas diffuser 58 when the contact tip 56 is fully installed (e.g., threaded) into the gas diffuser 58 (i.e., the non-threaded proximal end portion 98 does not physically contact the gas diffuser 58 when the contact tip 56 is fully installed into the gas diffuser 58). In particular, again, the proximal axial end 102 of the contact tip 56 does not contact the gas diffuser 58 when the contact tip 56 is fully installed (e.g., threaded) into the gas diffuser 58. Having only the external threading 60 and the exterior surfaces of the contact tip 56 that abut the gas diffuser 58 at axial locations downstream (i.e., distal) of the external threading 60 (e.g., including the tapered outer surface 104), be the only physical points of contact between the contact tip 56 and the gas diffuser 58 prevents the non-threaded proximal end portion 98 of the contact tip 56 from serving as a means of electrical conduction from the gas diffuser 58 to the contact tip 56. Instead, electrical conduction from the gas diffuser 58 to the contact tip 56 occurs only at the threaded middle portion 96 and the tapered outer surface 104 of the non-threaded distal end portion 94 of the contact tip 56.

Again, during the MIG welding process, electric current is transferred from the contact tip 56 to a welding electrode 18 that is continuously fed through the inner bore 111 of the contact tip 56. It has been found that a majority of this electric current transfer occurs towards the distal end portion 94 of the contact tip 56. By conducting electric current from the gas diffuser 58 to the contact tip 56 at axial locations at or near the distal end portion 94 of the contact tip 56, the overall electric current path from the gas diffuser 58 to the welding electrode 18 is shortened. This shortened path helps to reduce resistive heating generated within the contact tip 56 during the transfer of current from the gas diffuser 58 to the welding electrode 18. As described herein, this current transfer path does not include the non-threaded proximal end portion 98 (i.e., the "cooling tail") of the contact tip 56. The non-threaded proximal end portion 98 (i.e., the "cooling tail") thus primarily serves to help cool the contact tip 56 via convective heat transfer from the surfaces of the non-threaded proximal end portion 98 to the welding gas as it flows over these surfaces. Again, another feature of the embodiments of the contact tip 56 and gas diffuser 58 described herein is that the gas diffuser 58 helps shield the non-threaded proximal end portion 98 of the contact tip 56, the threaded middle portion 96 of the contact tip 56, and at least a part of the tapered outer surface 104 of the non-threaded distal end portion 94 of the contact tip 56 from heat generated by the welding arc 24. Specifically, as illustrated in FIG. 6, only a portion of the non-threaded distal end portion 94 of the contact tip 56 is external to the gas diffuser 58 when the contact tip 56 is installed within the gas diffuser 58.

More specifically, as illustrated in FIG. 7A, only a certain axial length $l_{exposed}$ of the non-threaded distal end portion 94 of the contact tip 56 is external to the gas diffuser 58 when the contact tip 56 is installed within the gas diffuser 58. For example, in certain embodiments, the axial length $l_{exposed}$ of the non-threaded distal end portion 94 of the contact tip 56 that is external to the gas diffuser 58 when the contact tip 56 is installed within the gas diffuser 58 may be in a range of approximately 15%-approximately 35% (e.g., between approximately 20% and approximately 30%, or approximately 25%) of the total axial length $l_{total}$ of the contact tip 56. In addition, in certain embodiments, the axial length $l_{exposed}$ of the non-threaded distal end portion 94 of the contact tip 56 that is external to the gas diffuser 58 when the contact tip 56 is installed within the gas diffuser 58 may be in a range of approximately 55%-approximately 75% (e.g., between approximately 60% and approximately 70%, or approximately 65%) of the axial length $l_{distal}$ of the non-threaded distal end portion 94 of the contact tip 56. Furthermore, it is noted that the surface area 120 of the contact tip 56 includes a rounded outer surface at the distal axial end 100 of the contact tip 56, further minimizing exposure to the welding arc 24. Again, by limiting this exposed surface area 120 of the contact tip 56, less radiant heat is absorbed into the contact tip 56, thereby extending the life of the contact tip 56.

As such, again, the gas diffuser 58 shields the portion of the non-threaded distal end portion 94 of the contact tip 56 that is not within the exposed axial length $l_{exposed}$ of the non-threaded distal end portion 94 from heat generated by the welding arc 24. In certain embodiments, as illustrated in FIG. 7A, an axial length $l_{tapered}$ of the tapered outer surface 104 of the contact tip 56 may be in a range of approximately 10%-approximately 25% (e.g., between approximately 10% and approximately 20%, between approximately 12% and approximately 18%, or approximately 15%) of the total axial length $l_{total}$ of the contact tip 56. In addition, in certain embodiments, the axial length $l_{tapered}$ of the tapered outer surface 104 of the contact tip 56 may be in a range of approximately 30%-approximately 50% (e.g., between approximately 35% and approximately 45%, or approximately 40%) of the total axial length $l_{distal}$ of the non-threaded distal end portion 94 of the contact tip 56.

As illustrated in FIG. 7A, in certain embodiments, the tapered outer surface 104 of the contact tip 56 (as well as the mating tapered inner surface 106 of the gas diffuser 58) may include a taper that increases in diameter from the shoulder 105 of the contact tip 56 toward the distal axial end 100 of the contact tip 56. For example, in certain embodiments, the tapered outer surface 104 of the contact tip 56 may increase in diameter from proximal end points $p_{proximal}$ (i.e., that transitions the tapered outer surface 104 to the shoulder 105) to distal end points $p_{distal}$ (i.e., that transitions the tapered outer surface 104 into an adjacent, downstream portion of the non-threaded distal end portion 94 of the contact tip 56. More specifically, in certain embodiments, an angle $\alpha_{tapered}$ formed from the proximal end points $p_{proximal}$ to the distal end points $p_{distal}$ relative to the central longitudinal axis 109 may be in a range of approximately 5 degrees-approximately 15 degrees (e.g., between approximately 8 degrees and approximately 12 degrees, or approximately 10 degrees).

Although illustrated in FIGS. 6 and 7A as having a tapered outer surface 104 that is substantially linear from the proximal end points $p_{proximal}$ to the distal end points $p_{distal}$, in other embodiments, the contact tip 56 may include a tapered outer surface 104 that is not substantially linear, but which may include various shapes and contours, such as convex curved outer surfaces, concave curved outer surfaces, stepped linear outer surfaces, stepped curved outer surfaces, or some combination thereof. Regardless of the specific shape or contour, the tapered outer surface 104 of the contact tip 56, through its interaction with the mating tapered inner surface 106 of the gas diffuser 58, aid in the alignment (e.g., concentricity) of the contact tip 56 when it is installed (e.g., threaded) into the gas diffuser 58.

Returning now to FIG. 7A, as opposed to the embodiments illustrated in FIGS. 3 and 5, the non-threaded proximal end portion 98 of the contact tip 56 does not include first and second portions 110, 112 connected by an angled connecting portion 114. Rather, the non-threaded proximal end portion 98 has substantially constant inner and outer diameters along the entire axial length $l_{proximal}$ of the non-threaded proximal end portion 98, except for a tapered inner diameter 144 at the proximal axial end 102 of the contact tip 56, which facilitates feeding of the welding wire into the contact tip 56. Indeed, it is noted that the substantially constant inner and outer diameters of the non-threaded proximal end portion 98 are substantially similar to substantially constant inner and outer diameters of the externally threaded middle portion 96. It is noted that the outer diameter of the externally threaded middle portion 96 is defined herein as the substantially constant outer diameter from which the external threading 60 extends radially. As such, the externally threaded middle portion 96 and the non-threaded proximal end portion 98 include substantially constant inner and outer diameters along a total axial length $(l_{middle}+l_{proximal})$ of the externally threaded middle portion 96 and the non-threaded proximal end portion 98, except for the tapered inner diameter 144 at the proximal axial end 102 of the contact tip 56. FIGS. 7B through 7I illustrate various views of the contact tip 56 of FIG. 7A to better illustrate the features of the contact tip 56.

Figure 21A:
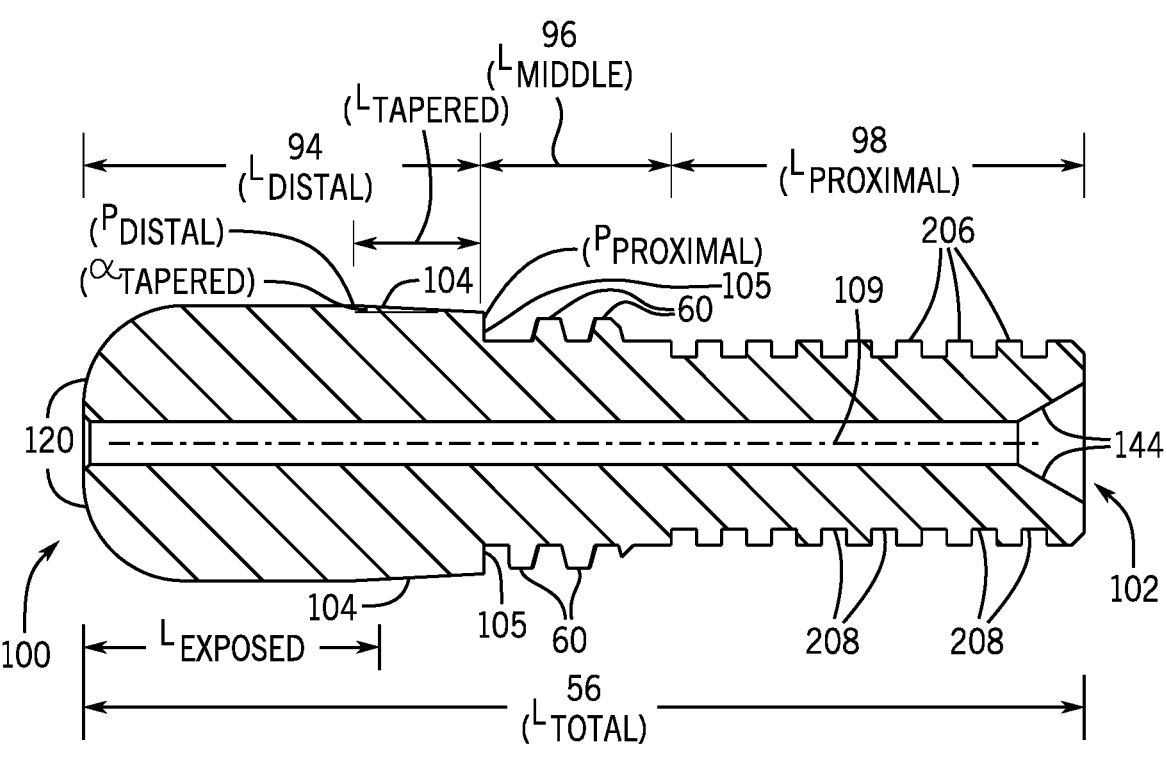
FIGS. 21A through 21I are various views of another exemplary contact tip similar to the contact tip of FIGS. 7A through 7I, in accordance with an embodiment.
Figure 21B:
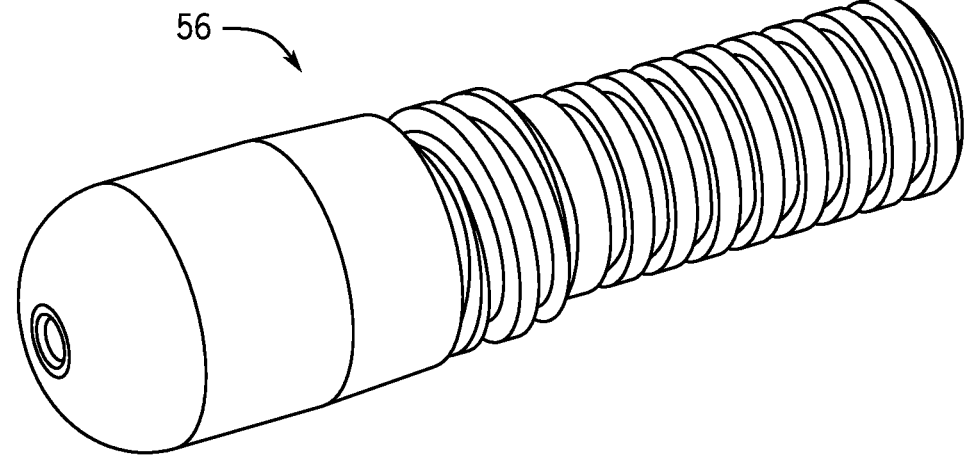
Figure 21C:
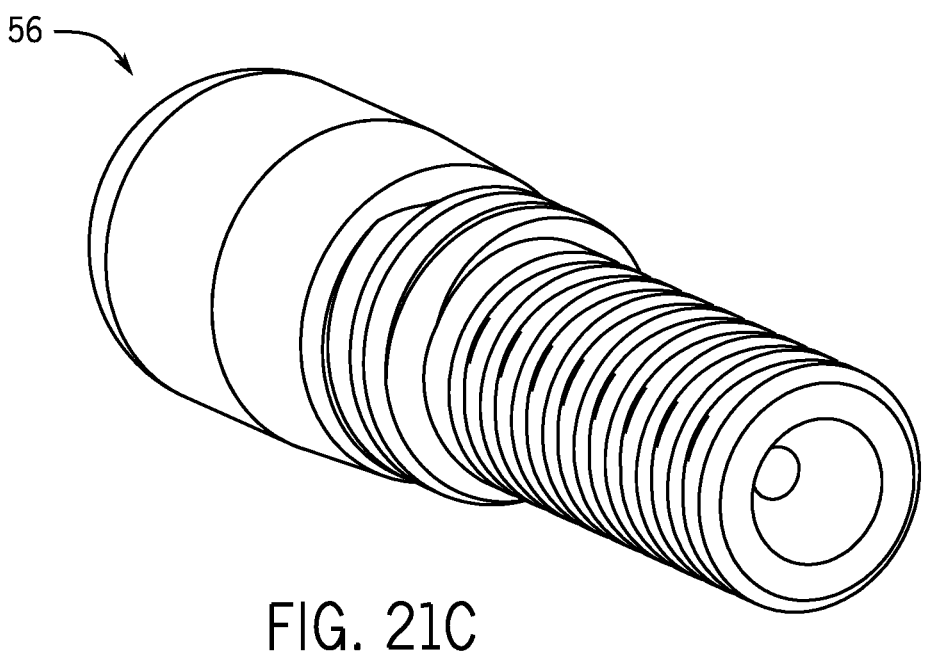
Figure 21D:
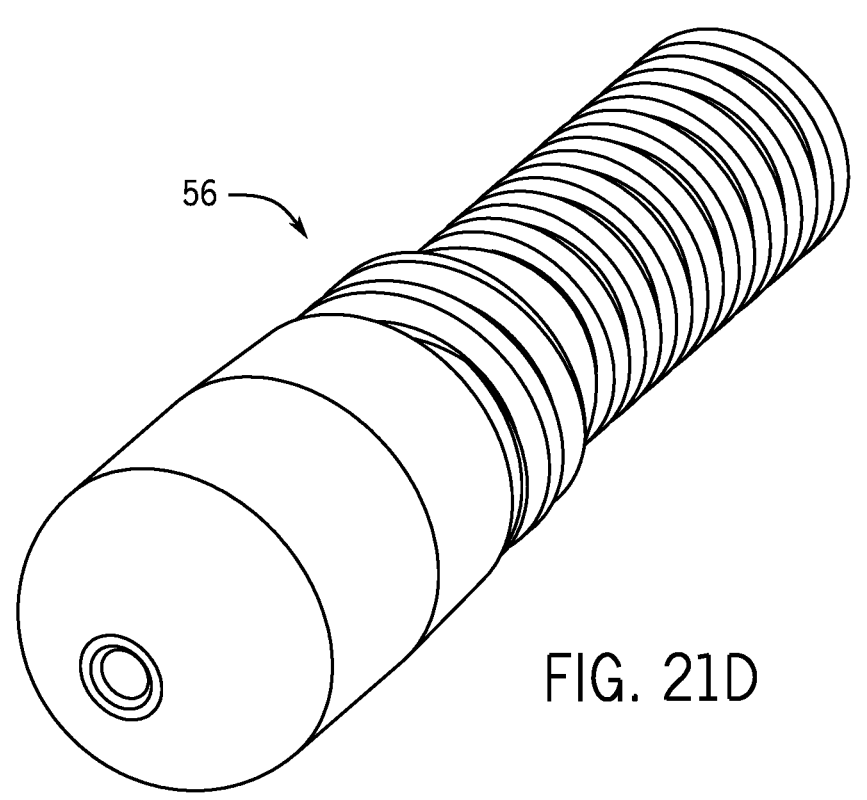
Figure 21E:
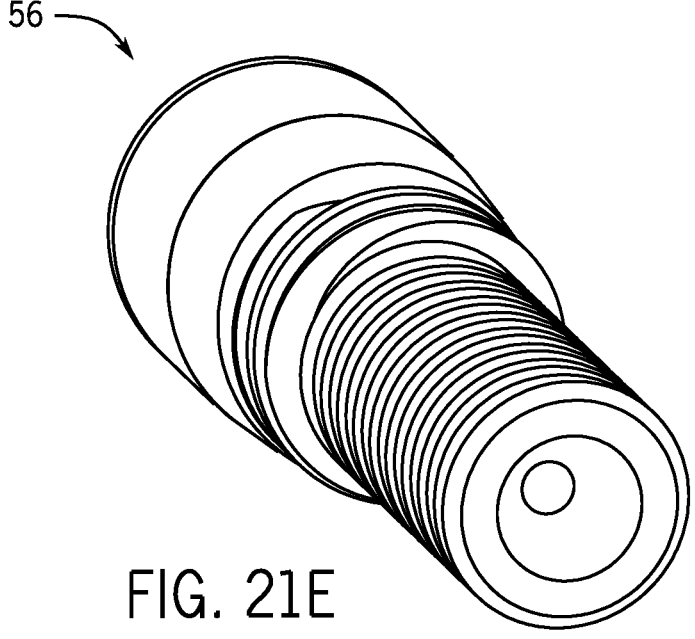
Figure 21F:
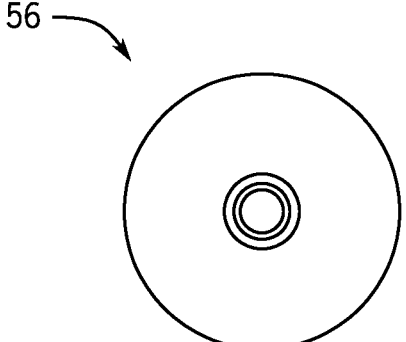
Figure 21G:
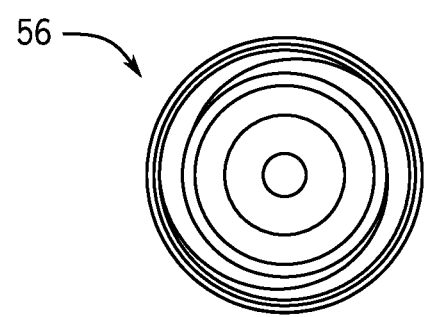
Figures 21H, 21I:
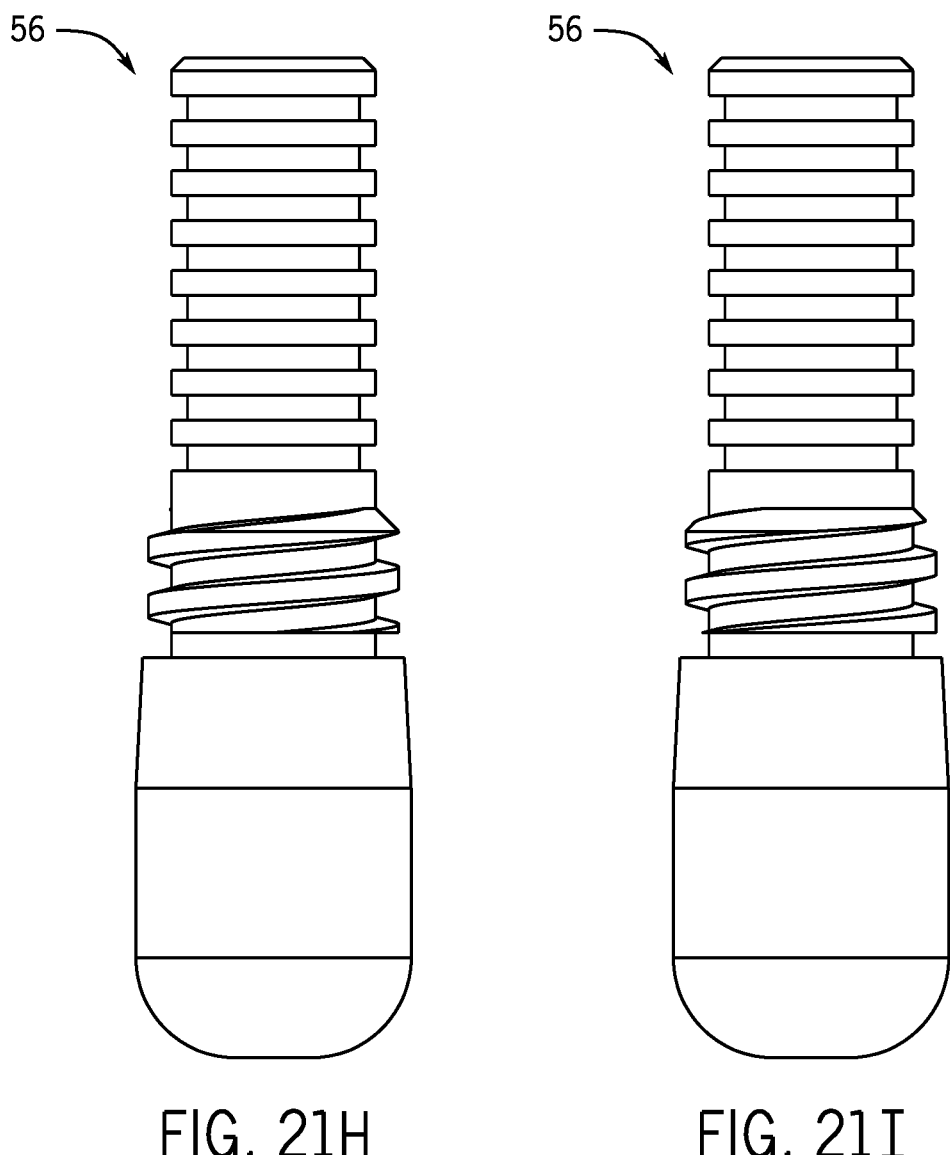

FIG. 21A is a cross-sectional side view of another embodiment of the contact tip 56 of FIG. 6. As illustrated in FIG. 21A, the contact tip 56 is substantially similar to the contact tip 56 illustrated in FIG. 7A. However, the contact tip 56 illustrated in FIG. 21A includes a plurality of cooling fins 206 that extend radially from the non-threaded proximal end portion 98 of the contact tip 56 about a circumference of the non-threaded proximal end portion 98. In particular, in the embodiment illustrated in FIG. 21A, a common outer diameter of the cooling fins 206 is substantially similar to the substantially constant outer diameter of the externally threaded middle portion 96 from which the external threading 60 extends radially. As such, grooves 208 are located between the cooling fins 206, as well as between the externally threaded middle portion 96 and the most distal (e.g., front) cooling fin 206. As with the embodiment of the contact tip 56 illustrated in FIG. 7A, none of the non-threaded proximal end portion 98 of the contact tip 56 illustrated in FIG. 21A makes physical contact with the gas diffuser 58 when the contact tip 56 is fully installed (e.g., threaded) into the gas diffuser 58. Rather, again, the external threading 60 and the exterior surfaces of the contact tip 56 that abut the gas diffuser 58 at axial locations downstream (i.e., distal) of the external threading 60 (e.g., including the tapered outer surface 104) are the only physical points of contact between the contact tip 56 and the gas diffuser 58 when the contact tip 56 is fully installed (e.g., threaded) into the gas diffuser 58. The cooling fins 206 increase the convective heat transfer potential of the "cooling tail" (i.e., the non-threaded proximal end portion 98) of the contact tip 56 insofar as the cooling fins 206 (and the adjacent grooves 208) increase the surface area of the non-threaded proximal end portion 98. FIGS. 21B through 21I illustrate various views of the contact tip 56 of FIG. 21A to better illustrate the features of the contact tip 56.

As described above, returning now to FIG. 6, the welding torch liner 118 may be adapted on the first axial end 124 with the liner stop 126. In certain embodiments, the gas diffuser 58 may be configured internally to interact with the liner stop 126 such that the welding torch liner 118 may not abut, reside within, nor be in any physical contact with the proximal axial end 102 of the contact tip 56. For example, as illustrated in FIG. 6, the contact tip 56 and the liner stop 126 do not physically interact when both are installed in the welding torch 16. In fact, the axial distance between the contact tip 56 and the liner stop 126 when both are installed in the welding torch 16 may be less than approximately ⅛", less than approximately ⅟₁₆", less than ⅟₃₂", or even smaller, in certain embodiments. However, in certain embodiments, the contact tip 56 and the liner stop 126 each have an outer diameter that is substantially similar to the other such that the axial flow of welding gas is not impeded in any way, as illustrated by arrow 108. Specifically, the outer diameter of the non-threaded proximal end portion 98 of the contact tip 56 may be substantially similar to the outer diameter of the second external surface 140 of the liner stop 126.

As such, again, the installation and removal of the contact tip 56 may be made easier in that the welding torch liner 118 may not exert any axial or counter-rotational forces against the proximal axial end 102 of the contact tip 56. In certain embodiments, as described herein, the gas diffuser 58 may also be configured internally to interact with the liner stop 126 such that the welding torch liner 118 maintains better concentricity between the welding torch liner 118 and the contact tip 56. Indeed, in certain embodiments, the liner stop 126 may be integral to the gas diffuser 58. In other words, the features of the liner stop 126, as described herein, may be part of the gas diffuser 58 in embodiments where the liner stop 126 and the gas diffuser 58 are integrated into a single component.

Figure 8A:
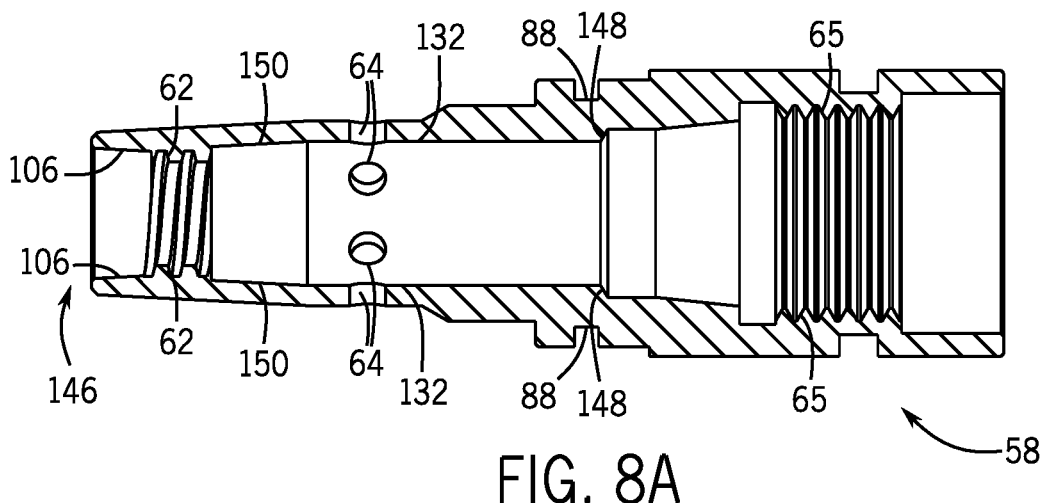
FIGS. 8A through 8E are various views of a gas diffuser of FIG. 6, in accordance with an embodiment.
Figure 8B:
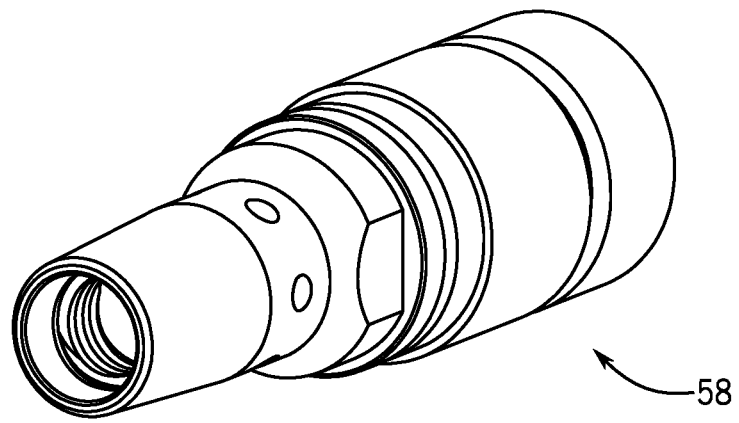
Figure 8C:
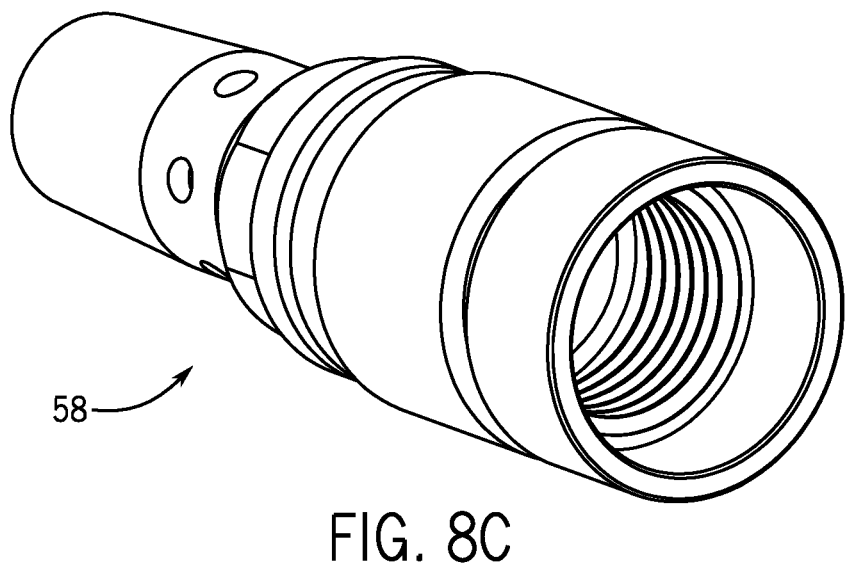
Figure 8D:
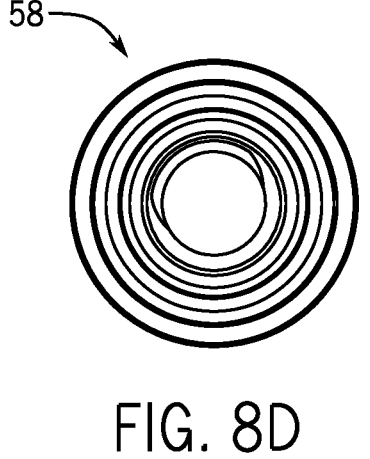
Figure 8E:
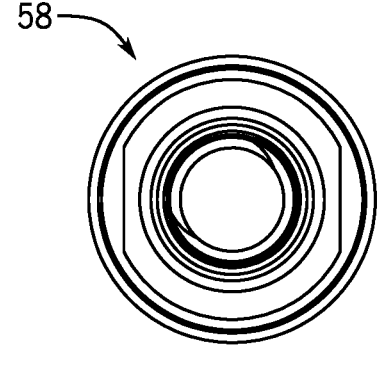

FIG. 8A is a cross-sectional side view of the gas diffuser 58 of FIG. 6. As illustrated, in certain embodiments, the gas diffuser 58 includes the tapered inner surface 106 at a front axial end 146 of the gas diffuser 58, which decreases in inner diameter moving away from the front axial end 146 of the gas diffuser 58. As described herein, the tapered inner surface 106 is configured to mate with the tapered outer surface 104 of the contact tip 56 when the contact tip 56 is installed in the gas diffuser 58. Adjacent the tapered inner surface 106, the gas diffuser 58 includes the internal threads 62 that are configured to mate with the external threads 60 of the contact tip 56 to secure the contact tip 56 within the gas diffuser 58. Adjacent the internal threads 62, the gas diffuser 58 includes a second tapered surface 150 that increases in inner diameter moving away from the front axial end 146 of the gas diffuser 58 until it reaches a portion of inner bore 152 of the gas diffuser 58 that has a substantially constant inner diameter, and through which the gas-through ports 64 extend to facilitate the flow of welding gas from the interior volume 67 of the gooseneck 46, through the one or more ports 142 of the welding stop 126, and into the internal volume 72 formed between the welding nozzle 48 and the contact tip 56. As illustrated, the internal bore 132 of the gas diffuser 58 is configured to mate with the external surface 136 of the liner stop 126, and also includes an internal shoulder 148 configured to mate with the internal shoulder 138 of the liner stop 126 to hold the liner stop 126 in place with respect to the gas diffuser 58 when the gas diffuser 58 is installed onto the gooseneck 46 (e.g., threaded onto the gooseneck 46 via the mating threads 65, 70, as illustrated in FIG. 6) over the contact tip 56 and the liner stop 126. In addition, as illustrated, the gas diffuser 58 includes the groove 88 (e.g., formed by the adjacent walls 90, 92 and the outer surface 86 of the gas diffuser 58, as illustrated in FIG. 4) into which the compressible member 74 may be inserted to facilitate threadless retention of the welding nozzle 48 over the gas diffuser 58. FIGS. 8B through 8E illustrate various views of the gas diffuser 58 of FIG. 8A to better illustrate the features of the gas diffuser 58.

Figure 9A:
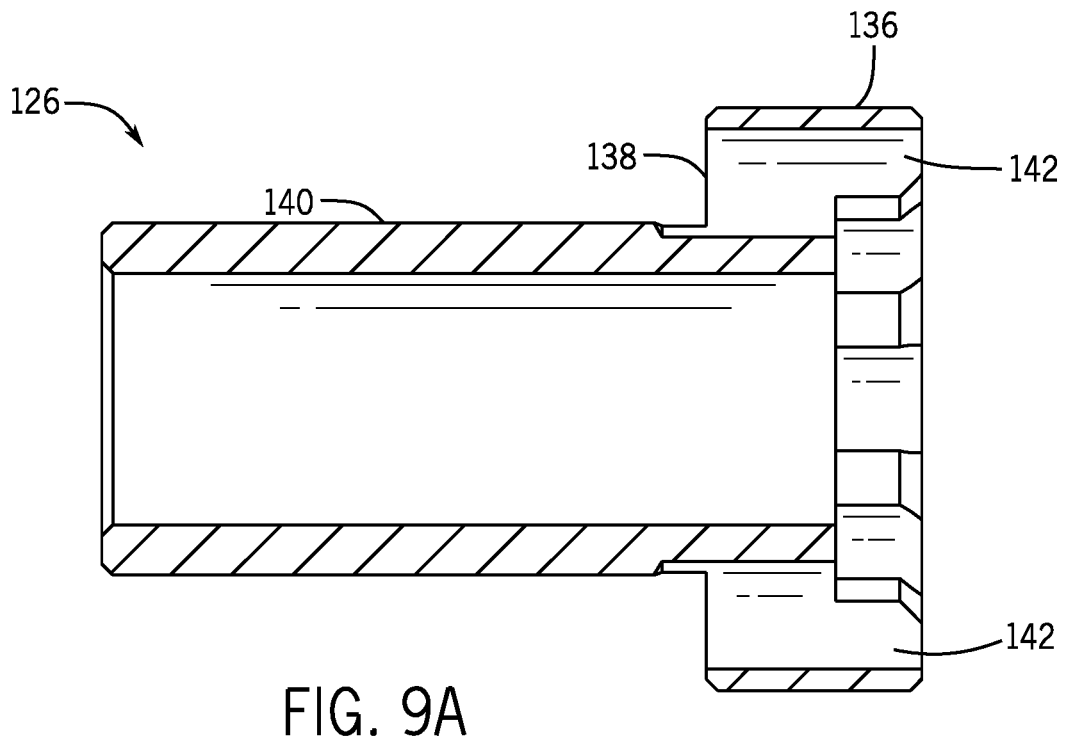
FIGS. 9A through 9D are various view of a liner stop, of a welding torch liner assembly, of FIG. 6, in accordance with an embodiment.
Figure 9B:
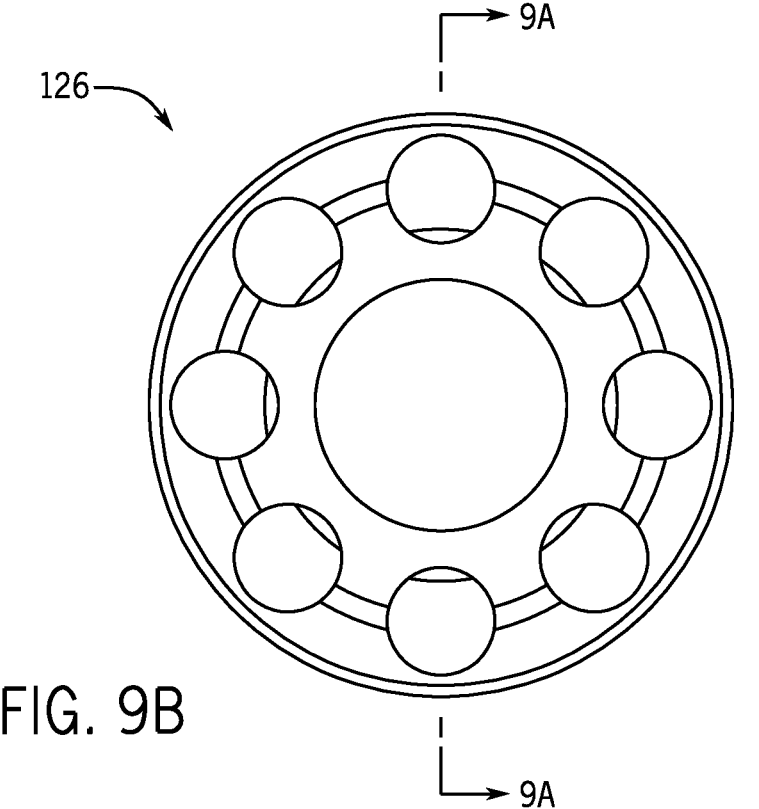
Figure 9C:
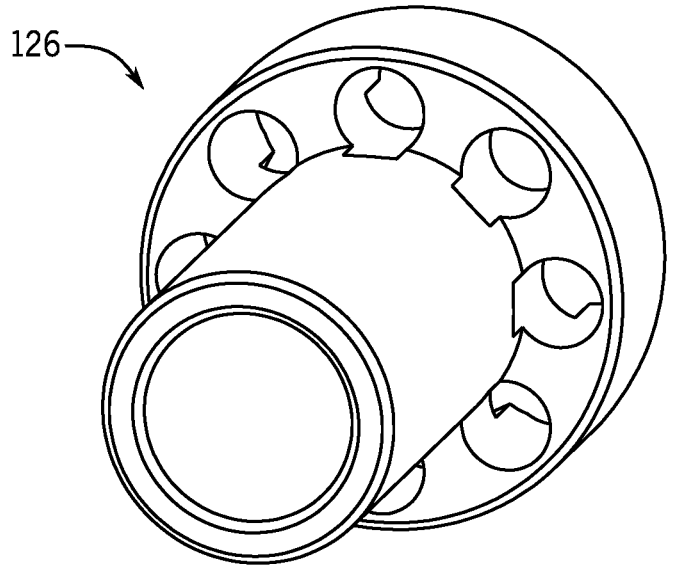
Figure 9D:
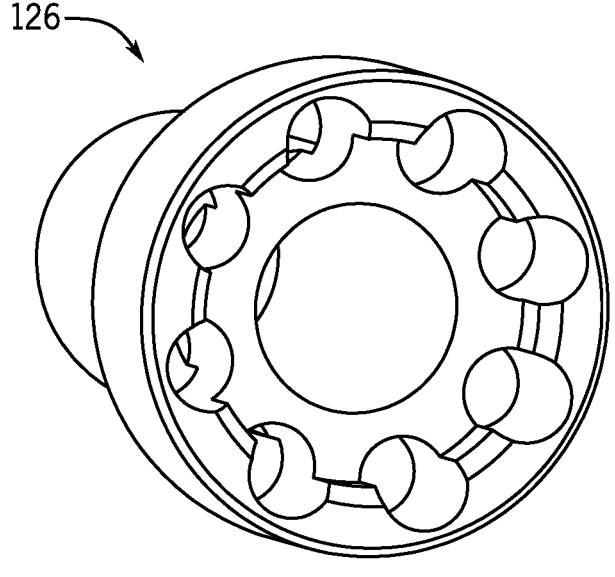

FIG. 9A is a cross-sectional side view of the liner stop 126 of FIG. 6. As illustrated, in certain embodiments, the liner stop 126 includes the first external surface 136 and external shoulder 138 configured to mate with the internal bore 132, including the internal shoulder 148, of the gas diffuser 58 to hold the liner stop 126 in place with respect to the gas diffuser 58 when the gas diffuser 58 is installed onto the gooseneck 46 (e.g., threaded onto the gooseneck 46 via the mating threads 65, 70, as illustrated in FIG. 6) over the contact tip 56 and the liner stop 126. In addition, as described herein, in certain embodiments, the second external surface 140 of the liner stop 126 facilitates the flow of welding gas through the welding torch 16 by having an outer diameter that generally matches (e.g., is substantially similar to) the outer diameter of the non-threaded proximal end portion 98 of the contact tip 56 illustrated in FIGS. 7A though 7I. Furthermore, as illustrated, in certain embodiments, the liner stop 126 includes one or more ports 142 that facilitate the flow of the welding gas from the interior volume 67 of the gooseneck 46 into the internal volume 72 formed between the welding nozzle 48 and the contact tip 56. FIGS. 9B through 9D illustrate various views of the liner stop 126 of FIG. 9A to better illustrate the features of the liner stop 126. Again, as described herein, in certain embodiments, the liner stop 126 of FIG. 9A and the gas diffuser 58 of FIG. 8A may be combined into a single, integrated component.

Figure 10:
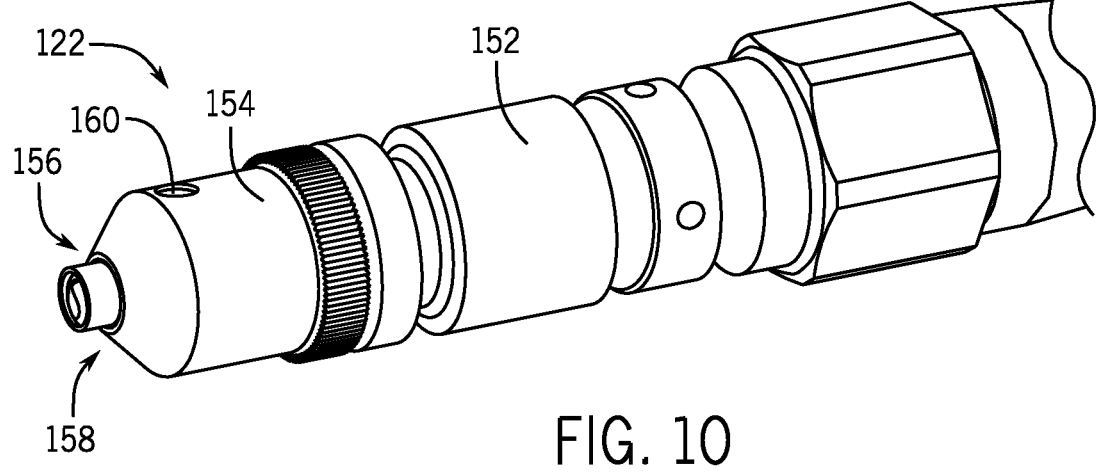
FIG. 10 is a perspective view of a rear connector of a welding torch coupled to a liner receiver of a welding torch liner assembly, in accordance with an embodiment.

As illustrated in FIG. 10, embodiments of the welding torch liner assembly 122 described herein also include a rear connector 152 disposed at a rear axial end of the welding torch cable 42, which is adapted with a liner receiver 154 of the welding torch liner assembly 122. In certain embodiments, the liner receiver 154 may be affixed to the rear connector 152 and has a liner receiver orifice 156 into which the unadapted (rear) axial end of the welding torch liner 118 may be inserted. As the welding torch liner 118 is fed into the gooseneck 46, the unadapted axial end 158 of the welding torch liner 118 will enter the liner receiver orifice 156 and pass through it. When the welding torch liner 118 has been fully installed into the welding torch 16 (i.e., when the liner stop 126 abuts the gooseneck 46), the unadapted axial end 158 of the welding torch liner 118 will extend through the end of the rear connector 152. The liner receiver 154 serves to align the welding torch liner 118 with a centerline of the rear connector 152.

In certain embodiments, the liner receiver 154 is fitted with a locking screw 160, which may be tightened against the welding torch liner 118 to secure the welding torch liner 118 in place with respect to the liner receiver 154. As such, the locking screw 160 prevents axial movement of the unadapted axial end 158 of the welding torch liner 118 in both axial directions. The liner receiver orifice 156 is designed to be only slightly larger than an outer diameter of the welding torch liner 118 that passes through it. The small difference in diameters allows the welding torch liner 118 to stay centered within the rear connector 152 even when the locking screw 160 applies a radial force against the welding torch liner 118. As such, the unadapted axial end 158 of the welding torch liner 118 is also considered to be "captured" when the locking screw 160 is tightened against the welding torch liner 118. In other words, the unadapted axial end 158 of the welding torch liner 118 is not able to retract into the torch cable 42, move out of the rear connector 152 (i.e., axially forward), or to sit radially off-center with respect to the rear connector 152. The unadapted axial end 158 of the welding torch liner 118 that protrudes from the rear connector 152 must be trimmed. However, no measuring is required, as with conventional liner designs. Rather, when the locking screw 160 is tightened against the welding torch liner 118, the welding torch liner 118 is simply trimmed approximately flush with the end of the liner receiver 154. As described in greater detail herein, in other embodiments, instead of using the locking screw 160 in the liner receiver 154, a collet or other feature may be used to capture the welding torch liner 118 at the rear connector 152.

As previously described, the rear connector 152 serves to locate and align the welding torch liner assembly 122 with the drive rolls that deliver welding wire into the welding torch 16. The welding torch liner assembly 122 serves as an entry point of the welding wire into the welding torch 16. Ideally, this entry point should be as close to the drive rolls as possible. The welding torch liner assembly 122 provides a welding torch liner 118 with an adjustable entry point-to-drive roll distance. The liner receiver 154 is of a "universal" protrusion length, but due to the design, the welding torch liner 118 may be adjusted to protrude further, if needed. Once the welding torch liner 118 has been trimmed approximately flush with the end of the liner receiver 154, the locking screw 160 may be loosened, and with a twist of the torch cable 42, the welding torch liner 118 will extend outward. The amount of extension can be fine-tuned by manipulation of the torch cable 42 and/or pushing/pulling on the exposed liner end. Once the desired length has been determined, the user simply re-tightens the locking screw 160. No re-trimming of the welding torch liner 118 is required. In some instances, this procedure may be performed with the welding torch 16 fully coupled to the wire feeder 14 via the torch cable 42.

In addition, if the user has difficulty trimming the welding torch liner 118 approximately flush with the end of the liner receiver 154, the locking screw 160 may be loosened, and the protruding portion of the welding torch liner 118 may be pushed into the liner receiver 154 until it is flush. The locking screw 160 may then be re-tightened, with no re-trimming needed. Again, in some instances, this procedure may be performed with the welding torch 16 fully coupled to the wire feeder 14 via the torch cable 42. Welding gas is present inside the rear connector 152 during the welding process, and must not leak outward. As such, as illustrated in FIG. 11, in certain embodiments, the liner receiver 154 includes seals 162 (e.g., on opposites axial sides of the locking screw 160) that seal welding gas from leaking out from the rear connector 152.

Figure 11:
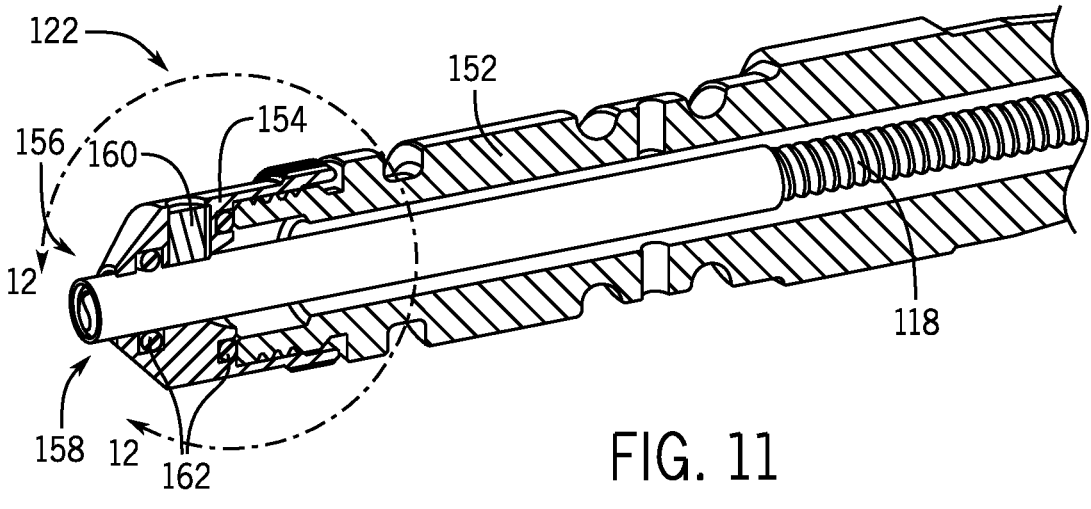
FIG. 11 is a cross-sectional perspective view of the rear connector of the welding torch and the liner receiver of the welding torch liner assembly of FIG. 10, in accordance with an embodiment.
Figure 12:
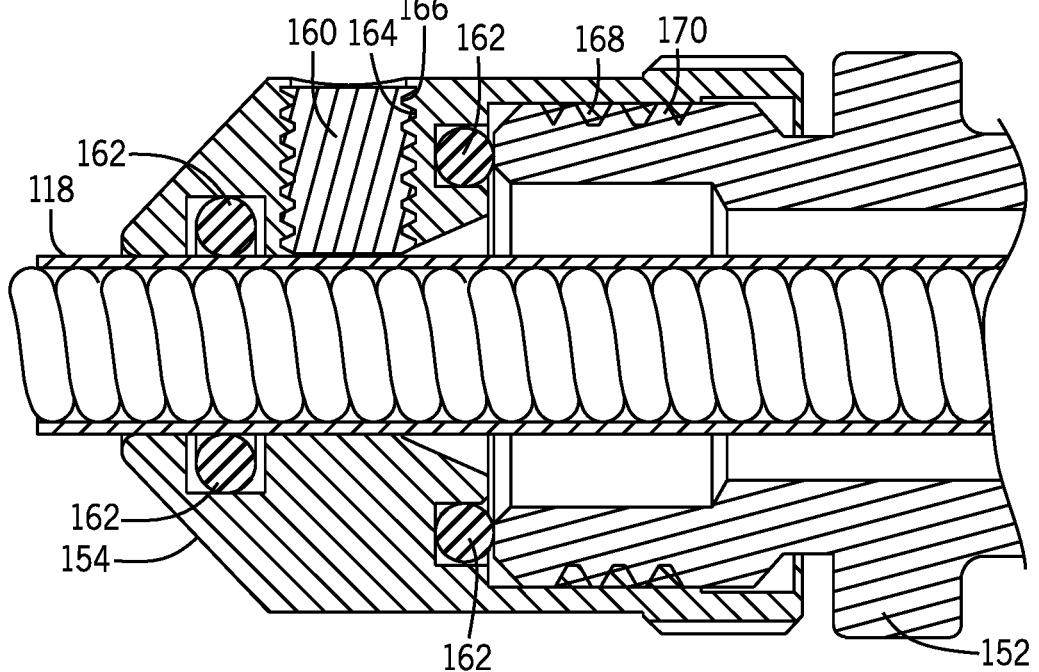
FIG. 12 is a cross-sectional side view of the rear connector of the welding torch and the liner receiver of the welding torch liner assembly of FIGS. 10 and 11, in accordance with an embodiment.
Figure 13:
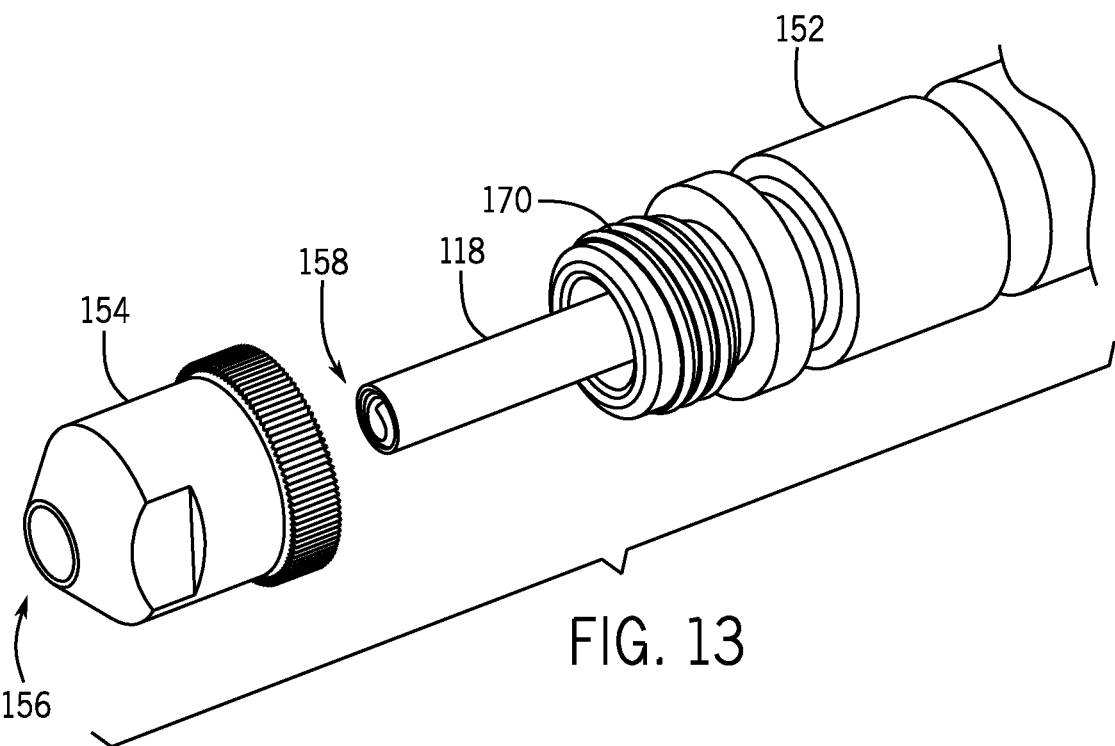
FIG. 13 is a perspective view of a rear connector of a welding torch configured to be coupled to a liner receiver of a welding torch liner assembly, in accordance with an embodiment.

FIG. 12 is a cross-sectional side view of the liner receiver 154 and the rear connector 152 of FIGS. 10 and 11. As illustrated, in certain embodiments, the locking screw 160 may include external threading 164 configured to mate with internal threading 166 through the liner receiver 154 to enable the locking screw 160 to be screwed down against the welding torch liner 118 to fixedly secure the welding torch liner 118 within the liner receiver 154. In addition, as illustrated, in certain embodiments, the liner receiver 154 may include internal threading 168 configured to mate with external threading 170 on the rear connector 152, which enable the liner receiver 154 to be fixedly secured to the rear connector 152.

Figure 14:
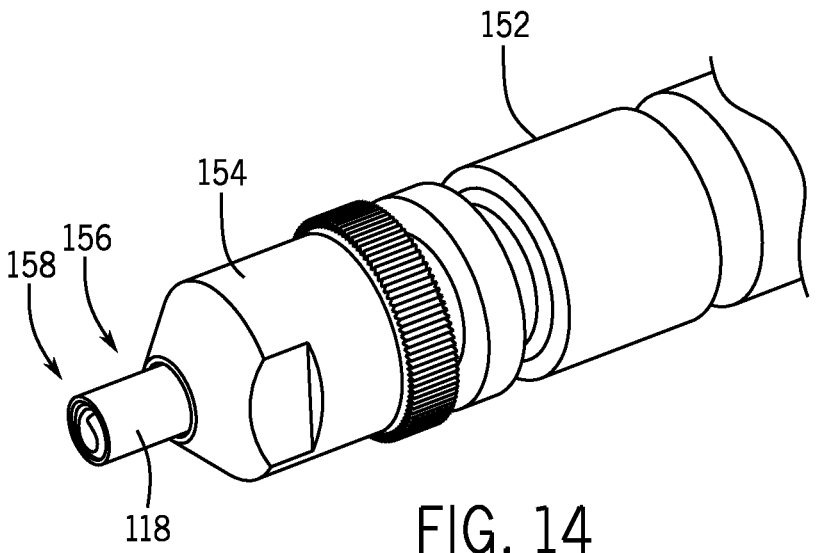
FIG. 14 is a perspective view of the rear connector of the welding torch coupled to the liner receiver of the welding torch liner assembly of FIG. 13, in accordance with an embodiment.

The liner receiver 154 illustrated in FIGS. 10-12 is but one possible embodiment that may be used to receive the welding torch liner 118, and to secure the welding torch liner 118 within the liner receiver 154. For example, FIGS. 13-16 illustrate another embodiment of the liner receiver 154, which may be used to receive the welding torch liner 118, and to secure the welding torch liner 118 within the liner receiver 154. However, as illustrated in FIGS. 13-16, this embodiment of the liner receiver 154 does not include a locking screw 160 for securing the welding torch liner 118 within the liner receiver 154. Rather, as described in greater detail herein, the embodiment of the liner receiver 154 illustrated in FIGS. 13-16 may instead include a washer 172 (e.g., a rubber washer, in certain embodiments) disposed within the liner receiver 154 (e.g., which may be a brass cap, in certain embodiments). As such, the liner receiver 154 and the washer 172 may collectively function as a "cap assembly" that may be installed over the rear connector 152 (e.g., which may be comprised of brass, and referred to as a brass pin, in certain embodiments), as illustrated in FIG. 14.

Figure 15:
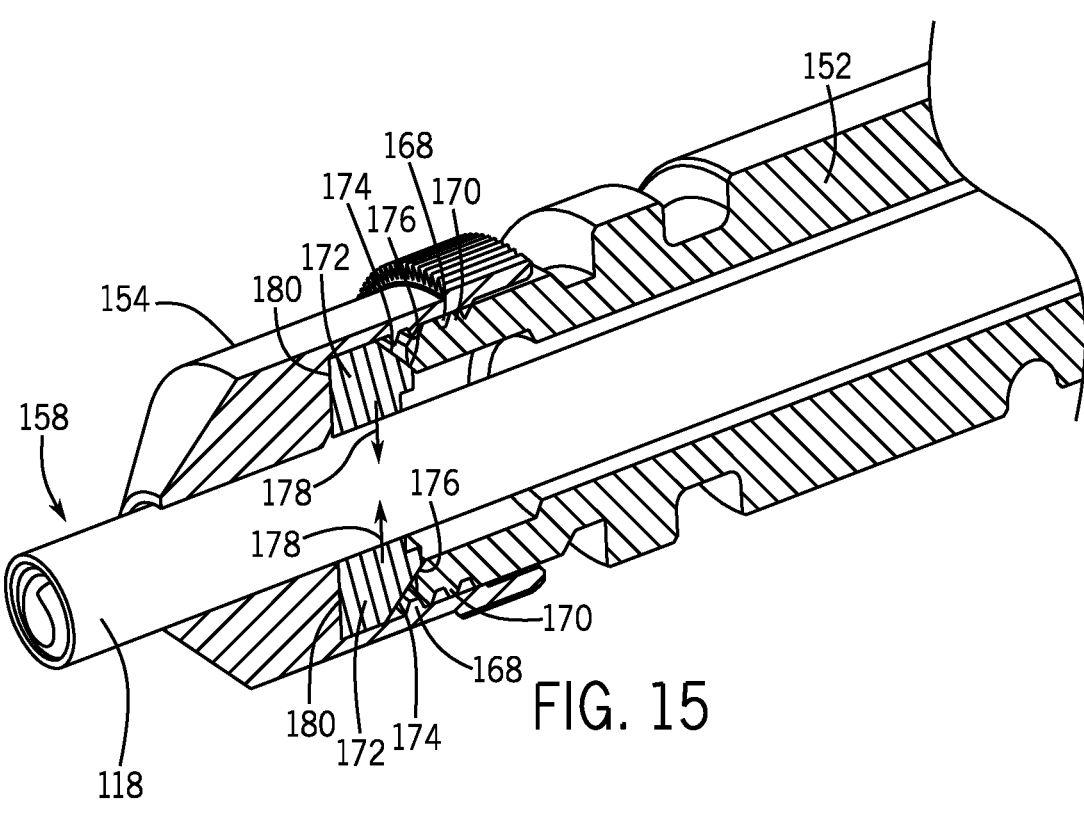
FIG. 15 is a cross-sectional perspective view of the rear connector of the welding torch and the liner receiver of the welding torch liner assembly of FIGS. 13 and 14, in accordance with an embodiment.
Figure 16:
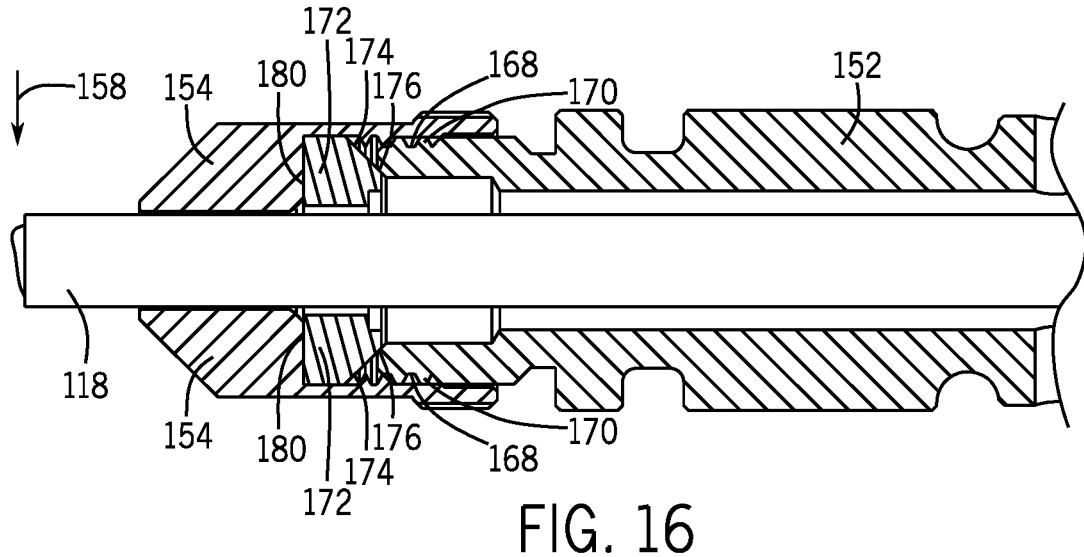
FIG. 16 is a cross-sectional side view of the rear connector of the welding torch and the liner receiver of the welding torch liner assembly of FIGS. 13-15, in accordance with an embodiment.

As the cap assembly (i.e., the liner receiver 154 and the washer 172) is installed onto (e.g., threaded onto via mating internal threading 168 of the liner receiver 154 and external threading 170 of the rear connector 152) the pin (i.e., the rear connector 152), the unadapted end 158 of the welding torch liner 118 passes through the orifice 156 of the liner receiver 154. As illustrated in FIG. 15, as the cap assembly is threaded onto the pin, a tapered external axial end face 174 of the washer 172 eventually contacts a mating tapered internal axial end face 176 of the pin. As the cap assembly is further threaded onto the pin, the washer 172 begins to compress both axially (e.g., between the tapered axial end face 176 of the pin and a radially extending orthogonal inner wall 180 of the liner receiver 154) and radially (e.g., via interaction of the mating tapered axial end faces 174, 176), thereby reducing the inner diameter of the washer 172, as illustrated by arrows 178. This reduced inner diameter causes the washer 172 to grip the welding torch liner 118, which prevents axial movement of the welding torch liner 118 relative to the washer 172 (and, hence, the cap assembly). In addition, the reduced inner diameter of the washer 172 provides a seal between the outer diameter of the welding torch liner 118 and the inner diameter of the washer 172, which prevents leakage of welding gas out through the orifice 156 of the liner receiver 154. Similarly, a gas seal is created at the interface between the washer 172 and the tapered axial end face 176 of the pin, which prevents welding gas from leaking through the threaded connection between the mating threads 168, 170 of the liner receiver 154 and the pin.

Figures 17, 18:
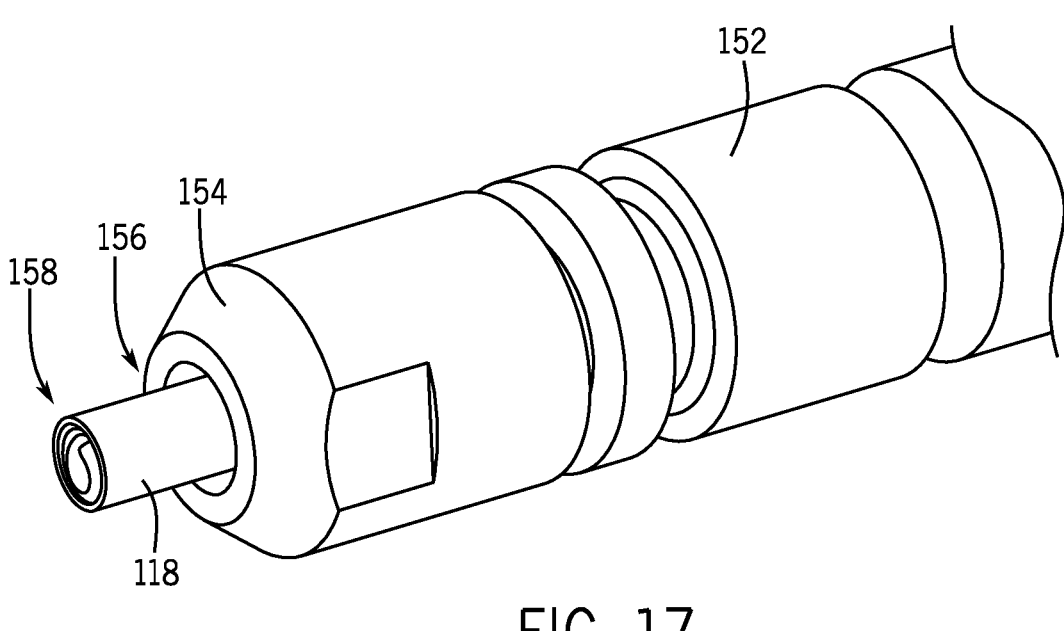
FIG. 17 is a perspective view of a rear connector of a welding torch coupled to a liner receiver of a welding torch liner assembly, in accordance with an embodiment.
FIG. 18 is a cross-sectional perspective view of the rear connector of the welding torch and the liner receiver of the welding torch liner assembly of FIG. 17, in accordance with an embodiment.

FIGS. 17-20 illustrate yet another embodiment of the liner receiver 154, which may be used to receive the welding torch liner 118, and to secure the welding torch liner 118 within the liner receiver 154. However, in the embodiment illustrated in FIGS. 17-20, the liner receiver 154 may instead include a washer 182 (e.g., a flat, rubber washer, in certain embodiments) and a collet 184 (e.g., a plastic collet, in certain embodiments) disposed within the liner receiver 154 (e.g., which, again, may be a brass cap, in certain embodiments). As such, the liner receiver 154, the washer 182, and the collet 184 may collectively function as a "cap assembly" that may be installed over the rear connector 152 (e.g., which may, again, be comprised of brass, and referred to as a brass pin, in certain embodiments), as illustrated in FIGS. 17 and 18.

Figure 19:
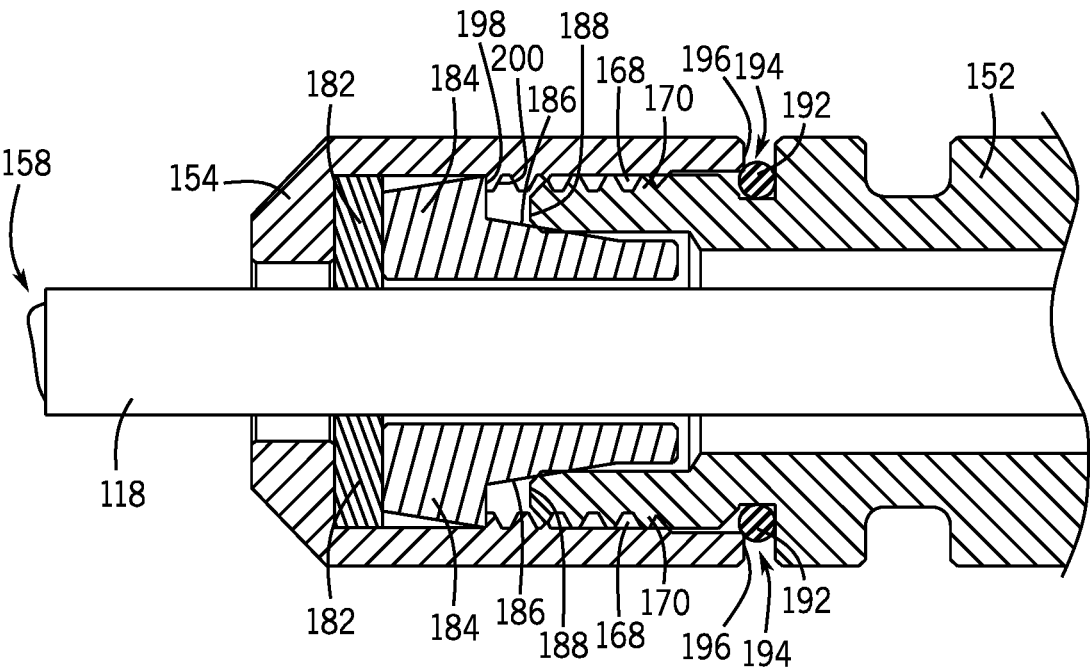
FIG. 19 is a cross-sectional side view of the rear connector of the welding torch and the liner receiver of the welding torch liner assembly of FIGS. 17 and 18, in accordance with an embodiment.

Again, as the cap assembly (i.e., the liner receiver 154, the washer 182, and the collet 184) is installed onto (e.g., threaded onto via mating internal threading 168 of the liner receiver 154 and external threading 170 of the rear connector 152) the pin (i.e., the rear connector 152), the unadapted end 158 of the welding torch liner 118 passes through the orifice 156 of the liner receiver 154. As illustrated in FIG. 19, as the cap assembly is threaded onto the pin, an external tapered surface 186 of the collet 184 eventually contacts an axial end face 188 of the pin. As the cap assembly is further threaded onto the pin, the washer collet 184 begins to compress both axially (e.g., between the axial end face 188 of the pin and the washer 182) and radially (e.g., via interaction of the external tapered surface 186 of the collet 184 and the axial end face 188 of the pin), thereby reducing the inner diameter of the washer collet 184, as illustrated by arrows 190. This reduced diameter causes the collet 184 to grip the welding torch liner 118, which prevents axial movement of the welding torch liner 118 relative to the collet 184 (and, hence, the cap assembly).

In the illustrated embodiment, the washer 182 has an inner diameter slightly smaller than the outer diameter of the welding torch liner 118 such that it forms a seal against the welding torch liner 118 to prevent welding gas from leaking from the interior of the welding torch 16. In addition, as illustrated, in certain embodiments, an o-ring 192 may be disposed in an external circumferential groove 194 of the pin at the end of the threading 170 of the pin. In particular, the o-ring 192 is disposed in the external circumferential groove 194 at the thread end opposite the axial end face 188 of the pin. As the cap assembly is fully threaded onto the pin, an axial end face 196 of the liner receiver 154 interacts with the o-ring 192, and compresses it slightly to form a gas seal, thereby preventing welding gas from leaking through the threaded connection between the mating threads 168, 170 of the liner receiver 154 and the pin. It should be noted that, in certain embodiments, the collet 184 may include an orthogonal external shoulder 198 adjacent the external tapered surface 186, which may interact with a mating internal shoulder 200 of the liner receiver 154, wherein the internal shoulder 200 is adjacent the internal threading 168 of the liner receiver 154, and such that the mating shoulders 198, 200 ensure that the collet 184 (as well as the washer 182) are always retained within the liner receiver 154.

Figure 20:
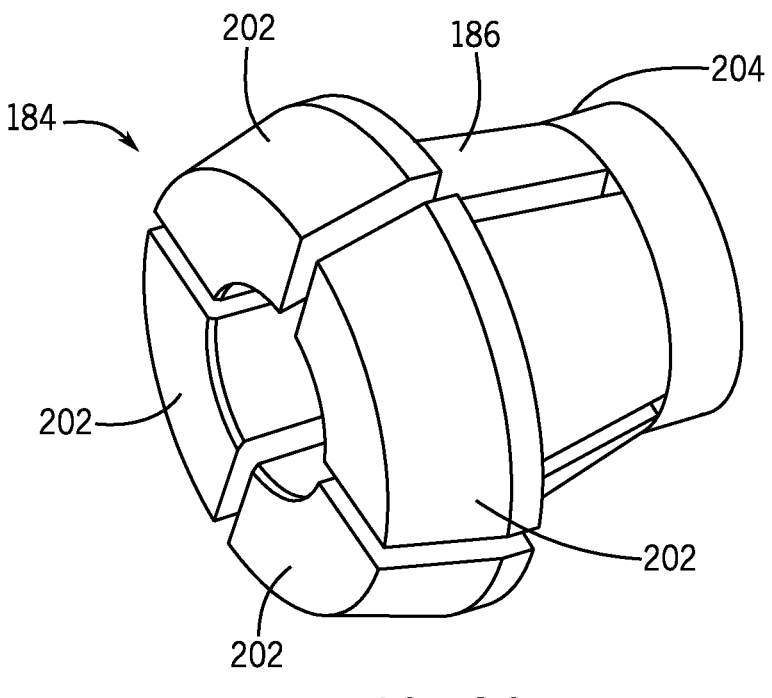
FIG. 20 is a perspective view of a collet of the liner receiver of FIGS. 17-19, in accordance with an embodiment.

FIG. 20 illustrates a perspective view of the collet 184 by itself. As illustrated, in certain embodiments, the collet 184 may include multiple, separate sections 202 (e.g., four sections, in the illustrated embodiment) attached to a common cylindrical axial end portion 204. It will be appreciated that the multiple, separate sections 202 of the collet 184 at least partially enable the compression of the collet 184 via interaction with the axial end face 188 of the pin, as described with respect to FIG. 19.

In summary, the welding torch liner 118 forms a long, tubular section through which welding wire may travel. The welding torch liner assembly 122 described herein may be installed into the welding torch 16 via the gooseneck 46 of the welding torch 16. The front axial end 124 of the welding torch liner 118 is fitted with the liner stop 126, which has a larger outer diameter than the front axial end 128 of the gooseneck 46. The liner stop 126 functions to limit how far the welding torch liner assembly 122 may be inserted into the gooseneck 46. An additional benefit is that the gas diffuser 58 also limits axial movement of the welding torch liner assembly 122 (e.g., back toward the front axial end of the welding torch 16) insofar as the gas diffuser 58 remains in a fixed position when installed in the welding torch 16. Therefore, the liner stop 126 cannot move toward the front axial end of the welding torch 16. Furthermore, the gas diffuser 58 serves to radially align (e.g., center) the welding torch liner assembly 122 with the contact tip 56.

In addition, embodiments of the present disclosure include a separate liner receiver 154 that is not affixed to the welding torch liner assembly 122, but rather may be removably affixed to (e.g., threaded onto) the rear connector 152 of the welding torch 16. The welding torch liner assembly 122 is fitted on one axial end with the liner stop 126 while the opposite axial end is either "bare" or fitted with "shrink tubing" that covers a portion of the tubular section. The liner receiver 154 includes an orifice 156 through which this axial end of the welding torch liner 118 may pass as it is installed through the gooseneck 46 of the welding torch 16. In certain embodiments, the liner receiver 154 includes a locking screw 160 that may be tightened to secure the welding torch liner assembly 122 within the liner receiver 154. In other embodiments, the liner receiver 154 includes a washer 172 that may be used to secure the welding torch liner assembly within the liner receiver 154. In yet other embodiments, the liner receiver 154 includes a collet 184 that may be used to secure the welding torch liner assembly within the liner receiver 154.

The liner receiver 154 thus serves to prevent axial movement of the welding torch liner assembly 122 within the rear connector 152 of the welding torch 16. The liner receiver 154 further serves to axially align the welding torch liner assembly 122 within the rear connector 152 of the welding torch 16.

As described herein, the front load, captured end/captured end embodiments described herein eliminate, or at least reduce, problems relating to liner trimming at the gooseneck, liner retraction at the gooseneck, misalignment of the liner with the contact tip, gas diffuser removal (e.g., when using a locking screw in the gas diffuser), tightening/loosening locking screws located in the gas diffuser, determining if a front loaded liner is fully seated in a receiver, liner retraction at the rear connector, liner trimming at the receiver, wire entry point-to-drive roll distance, and so forth. The disclosed embodiments also include a contact tip 56 that promotes longer tip life by helping to cool the contact tip 56 through convection. In addition, the amount of surface area of the contact tip 56 that is exposed to the welding arc is minimized to reduce radiant heat input from the welding arc and, thus, also promote long tip life. Furthermore, the disclosed embodiments show improved nozzle retention over conventional systems. There is less wear on nozzle retention surfaces for maintained retention over time.

As used herein, when referring to certain property values, the terms "approximately", "substantially similar", and "substantially constant" may be interpreted as meaning properties having values within 2%, within 1%, within 0.5%, or even less, depending on manufacturing tolerances, of the stated value (or comparative property).

While only certain features of the subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A welding contact tip comprising:

a first axial end portion having a welding wire outlet of an internal bore of the welding contact tip;

a threaded middle portion adjacent the first axial end portion, wherein the threaded middle portion comprises external threads configured to mate with internal threads of a gas diffuser of a welding torch;

a second axial end portion adjacent the threaded middle portion and configured to extend an exterior of the second axial end portion into a shielding gas flow path within the gas diffuser;

wherein the first axial end portion comprises a tapered outer surface adjacent the threaded middle portion and configured to abut a mating tapered inner surface of the gas diffuser of the welding torch;

wherein the welding contact tip comprises a shoulder between the tapered outer surface of the first axial portion and the threaded middle portion, and an axial gap between the shoulder and the threaded middle portion, the axial gap having a constant outer diameter;

wherein the second axial end portion has a uniform outer diameter along at least a portion of the length of the second axial end portion, wherein the uniform outer diameter is less than an outer diameter of the first axial end portion; and wherein the tapered outer surface increases in diameter from the shoulder to match the outer diameter of the first axial end portion.

2. The welding contact tip of claim 1, wherein an axial length of the tapered outer surface is between 5% and 25% of a total axial length of the welding contact tip.

3. The welding contact tip of claim 2, wherein the axial length of the tapered outer surface is between 10% and 20% of the total axial length of the welding contact tip.

4. The welding contact tip of claim 3, wherein the axial length of the tapered outer surface is 15% of the total axial length of the welding contact tip.

5. The welding contact tip of claim 1, wherein an axial length of the tapered outer surface is between 30% and 50% of an axial length of the first axial end portion.

6. The welding contact tip of claim 5, wherein the axial length of the tapered outer surface is between 35% and 45% of the axial length of the first axial end portion.

7. The welding contact tip of claim 6, wherein the axial length of the tapered outer surface is 40% of the axial length of the first axial end portion.

8. The welding contact tip of claim 1, wherein an angle of the tapered outer surface relative to a longitudinal axis of the welding contact tip is between 5 degrees and 15 degrees.

9. The welding contact tip of claim 8, wherein the angle of the tapered outer surface relative to the longitudinal axis of the welding contact tip is between 8 degrees and 12 degrees.

10. The welding contact tip of claim 9, wherein the angle of the tapered outer surface relative to the longitudinal axis of the welding contact tip is 10 degrees.

11. The welding contact tip of claim 1, wherein the tapered outer surface is substantially linear.

12. The welding contact tip of claim 1, wherein the outer surface of the second axial end portion does not abut against a mating surface.

13. The welding contact tip of claim 1, wherein an axial length of the second axial end portion is between 25% and 45% of a total axial length of the welding contact tip.

14. The welding contact tip of claim 13, wherein an axial length of the second axial end portion is between 30% and 40% of a total axial length of the welding contact tip.

15. The welding contact tip of claim 1, wherein the second axial end portion is configured to be exposed to shielding gas within the gas diffuser.

16. The welding contact tip of claim 1, wherein the tapered outer surface comprises a consistent outer diameter around a circumference of the welding contact tip.

* * * * *